US010841516B2

(12) United States Patent
Hoevenaar et al.

(10) Patent No.: US 10,841,516 B2
(45) Date of Patent: Nov. 17, 2020

(54) METHODS AND SYSTEMS FOR THERMAL IMAGE DISPLAY

(71) Applicant: Snap-on Incorporated, Kenosha, WI (US)

(72) Inventors: Robert Hoevenaar, De Weere (NL); Timothy G. Ruther, Carpentersville, IL (US)

(73) Assignee: SNAP-ON INCORPORATED, Kenosha, WI (US)

( * ) Notice: Subject to any disclaimer, the term of this patent is extended or adjusted under 35 U.S.C. 154(b) by 106 days.

(21) Appl. No.: 16/020,694

(22) Filed: Jun. 27, 2018

(65) Prior Publication Data

US 2020/0007796 A1    Jan. 2, 2020

(51) Int. Cl.
| | |
|---|---|
| *H04N 5/33* | (2006.01) |
| *H04N 13/282* | (2018.01) |
| *G06T 3/40* | (2006.01) |
| *G06T 7/00* | (2017.01) |
| *H04N 5/225* | (2006.01) |

(52) U.S. Cl.
CPC ............... *H04N 5/332* (2013.01); *G06T 3/40* (2013.01); *G06T 7/0004* (2013.01); *H04N 5/2253* (2013.01); *H04N 13/282* (2018.05); *G06T 2207/10048* (2013.01); *G06T 2207/20221* (2013.01); *G06T 2207/30108* (2013.01)

(58) Field of Classification Search
CPC ...................................................... H04N 5/332
USPC ......................................................... 348/86
See application file for complete search history.

(56) References Cited

U.S. PATENT DOCUMENTS

| | | |
|---|---|---|
| 9,616,568 B1 | 4/2017 | Russell |
| 9,971,792 B2 | 5/2018 | Solli |
| 2002/0065844 A1 | 5/2002 | Robinson et al. |
| 2008/0099678 A1 | 5/2008 | Johnson et al. |
| 2009/0010633 A1 | 1/2009 | Strandemar et al. |

(Continued)

FOREIGN PATENT DOCUMENTS

| | | |
|---|---|---|
| EP | 2107799 A1 | 10/2009 |
| WO | 2014/100787 A1 | 6/2014 |

OTHER PUBLICATIONS

Wisynth Wiki; FAQ YV12; Apr. 7, 2016.

(Continued)

*Primary Examiner* — Eileen M Adams
*Assistant Examiner* — Daniel T Tekle
(74) *Attorney, Agent, or Firm* — McDonnell Boehnen Hulbert & Berghoff LLP

(57) ABSTRACT

An embodiment includes capturing, via a first camera, a first image having a first pixel density, a pixel of the first image corresponding to the first optical axis is substantially centered within the first image; capturing, via the second camera, a second image having a second pixel density that is greater than the first pixel density, where a pixel of the second image that corresponds to the first optical axis is off-center within the second image; processing the second image to generate a fourth image such that a pixel of the fourth image that corresponds to the first optical axis is substantially centered within the fourth image, where a pixel density of the first image is substantially equal to a pixel density of the fourth image, and where the fourth image represents a field of view that is substantially equal to field of view represented by the first image.

20 Claims, 17 Drawing Sheets

(56) References Cited

U.S. PATENT DOCUMENTS

| | | |
|---|---|---|
| 2009/0172129 A1 | 7/2009 | Singh et al. |
| 2010/0045809 A1 | 2/2010 | Packard |
| 2011/0262053 A1 | 10/2011 | Strandemar |
| 2013/0110344 A1 | 5/2013 | Merg et al. |
| 2014/0164349 A1 | 6/2014 | Cudak et al. |
| 2014/0247365 A1 | 9/2014 | Gardner et al. |
| 2014/0267633 A1* | 9/2014 | Venkataraman ........ G06T 7/593 348/48 |
| 2015/0022667 A1 | 1/2015 | McManus et al. |
| 2015/0098663 A1 | 4/2015 | Heinke |
| 2016/0041039 A1 | 2/2016 | Olsson |
| 2016/0364629 A1 | 12/2016 | Solli |
| 2018/0239784 A1 | 8/2018 | Solli et al. |
| 2018/0338082 A1* | 11/2018 | Baqai ................. H04N 5/23235 |

OTHER PUBLICATIONS

Sullivan, Gary and Estrop, Stephen; Recommended 8-Bit YUV Formats for Video Rendering; Nov. 2008.

NXP Semiconductors Inc.; i.MX 7Solo Applications Processor Reference Manual; Aug. 2016 (submitted via five PDF files).

FLIR Systems, Inc.; User's manual FLIR GF3xx series; T559157; Oct. 23, 2017.

Snap-On Incorporated; Diagnostic Thermal Imager, User Manual; ZEETH3006 Rev. A 6-K-16 Nagbau; Oct. 2016.

FLIR Systems, Inc.; FLIR Systems introduces Multi Spectral Dynamic Imaging (MSX); Innovative feature for extremely detail rich thermal images; downloaded from the world wide web at http://www.flir.co.uk/cs/display/?d=56012 on Apr. 30, 2018.

Fluke Corporation; Development Insider; How patent-pending technology blends thermal and visible light; Oct. 2006.

Segger Microcontroller GmbH & Co. KG; emWin; Graphic Library with Graphical User Interface; User & Reference Guide; Document UM03001; Mar. 6, 2017.

Navico Holdings AS; Lowrance; HDS Gen3; Operator Manual; Apr. 25, 2017.

FLIR Systems, Inc.; FLIR C3; Dec. 29, 2016.

FLIR Systems, Inc, User's manual FLIR Cx series; Publication T559918; May 2, 2017.

Fluke Corporation; SmartView 3.2.1; Feb. 22, 2012.

Fluke Corporation; Fluke SmartView IR analysis and reporting software; Aug. 2007.

Fluke Corporation; Technical Data; Fluke Connect SmartView Desktop software; Apr. 2017.

FLIR Muon, FLIR Systems, 5 pages, http://www.flir.co.uk/, Apr. 16, 2018.

FLIR Exx-Series, Advanced Thermal Imaging, 7 pages, www.flir.com, Mar. 7, 2018.

FLIR, Lepton Engineering Datasheet, 74 pages, Document No. 500-0763-01-09 Rev 110, Dec. 7, 2016.

U.S. Appl. No. 16/020,970, filed Jun. 27, 2018, inventors: Robert Hoevenaar, Joshua C. Covington, Oswaldo Neri, Roy S. Brozovich, Timothy G. Ruther, and Michael D. LaFerle.

U.S. Appl. No. 16/020,867, filed Jun. 27, 2018, inventors: Robert Hoevenaar,Timothy G. Ruther, and Oswaldo Neri.

U.S. Appl. No. 16/020,976, filed Jun. 27, 2018, inventors: Joshua C. Covington, Oswaldo Ned, Roy S. Brozovich, Timothy G. Ruther, and Michael D. LaFerle.

FLIR Systems AB; GenICam ICD FLIR AX5 Camera—PC; Jul. 3, 2014.

FLIR Systems, Inc.; FLIR Lepton 80–60 Radiometric Longwave Infrared (LWIR) Camera Module; Jun. 19, 2017.

Security Electronics and Networks; FLIR Develops Muon Thermal Imaging Camera Core for OEMs; Sep. 10, 2014.

IR Tools, Master your thermal camera's Automatic Gain Control (AGS), Mar. 27, 2015.

Fluke Corporation, Thermal imaging terminology—explained, Jul. 2009.

FLIR Systems AB; FLIR One, User Guide second generation for Apple iOS, Nov. 9, 2015.

Jimenez, Castro et al.; "Thermal Image Sensing Model for Robotic Planning and Search", (14248220) Aug. 2016, vol. 16, Issue 8, Abstract, 1 page.

Kumar, Mathan B. et al.; "Multiple kernel scale invariant feature transform and cross indexing for image search and retrieval", Mar. 2018, vol. 66, Issue 2, Abstract, 1 page.

Matteoli, Sara et al.; "A novel image processing procedure for thermographic image analysis", Medical & Biological Engineering & Computing, Oct. 2018, vol. 56, Issue 10, Abstract, 1 page.

Azari, Milad Niaz et al.; "Intelligent Fault Detection in Power Distribution Systems Using Thermos-grams by Ensemble Classifiers", Automatika: Journal for Control, Measurement, Electronics, Computing & Communications, Oct.-Dec. 2016, vol. 57, Issue 4, Abstract, 1 page.

USPTO Patent Applications Database; abstract of U.S. Appl. No. 15/960,453; title: Image retrieval and processing systems and methods; applicant: FLIR Systems AB; inventors; Martin Solli and Stefan Bergstrom; published on Aug. 23, 2018, 1 page.

De Oliveira, Duilhio Candido et al.; "Using Deep Learning and Low-Cost RGB and Thermal Cameras to Detect Pedestrians in Aerial Images Captured by Multirotor UAV", (14248220) Jul. 1, 2018, vol. 18, Issue 7, abstract., 2 pages.

Marell, James et al.; "A comparison of image inspection modes for a visual search and rescue task", Behaviour & Information Technology, Sep. 2014, vol. 33, Issue 9, abstract, 1 page.

Wang, Z. et al.; "Stream Line-Based Pattern Search in Flows", Computer Graphics Forum, Dec. 2017, vol. 36, Issue 8, abstract, 1 page.

USPTO Patent Applications Database; abstract of U.S. Pat. No. 9,971,792; title: Image retrieval and processing systems and methods; applicant: FLIR Systems AB; inventor: Martin Solli; filed Jun. 9, 2016, dated May 15, 2018, 1 page.

Raza, Shan-E-Ahmed et al.; "Automatic Detection of Diseased Tomato Plants Using Thermal and Stereo Visible Light Images", M. PLos One, Apr. 2015, vol. 10, Issue 4, abstract, 1 page.

Barcelos, Emilio Z. et al.; "A Combined Method for segmentation and registration for an advance and progressive evaluation of thermal images", Sensors (14248220) 2014, vol. 14, Issue 11, abstract, 1 page.

Basurto, Chantal et al.; "Multi-criteria analysis for the integrated performance assessment of complex fenestration systems", Building Research & Information, Nov. 2017, vol. 45, Issue 8, abstract, 1 page.

Riaz, Irfan et al; "Human Detection by Using Centrist Features for Thermal Images", IADIS International Journal on Computer Science & Information Systems, 2013, vol. 8, Issue 2, abstract., 1 page.

Lin, Dong et al"Automatic Spatio-Temporal Flow Velocity Measurement in Small Rivers Using Thermal Image Sequences", ISPRS Annals of Photogrammetry, Remote Sensing & Spatial Information Sciences, 2018, vol. 4, Issue 2, Publisher: Copernicus Gesellschaft mbH; abstract, 1 page.

Kremis, I.I. et al.; "Scanning Thermal Imaging Device Based on a Domestic Photodetector Device", Journal of Communications Technology and Electronics, Mar. 2018, vol. 63, Issue 3, abstract, 1 page.

Trivedi, Indraji N. et al.; "An economic load dispatch and multiple environmental dispatch problem solution with microgrids using interior search algorithm", Neural Computing & Applications, Oct. 2018, vol. 30, Issue 7, abstract, 1 page.

Chaudhry, F.A. et al.; "A novel chaotic differential evolution hybridized with quadratic programming for short-term hydrothermal coordination", Neural Computing & Applications, Dec. 2018, vol. 30, Issue 11, abstract, 1 page.

USPTO Patent Applications Database; abstract of U.S. Pat. No. 9,616,568; title: Generating a grasp affordance for an object based on a thermal image of the object that is captured following human manipulation of the object; applicant: X Development LLC; inventor: Jared Stephan Russell; dated Apr. 11, 2017, abstract, 1 page.

Kong, Seong et al.; "Multiscale Fusion of Visible and Thermal IR Images for Illumination-Invariant Face Recognition", International Journal of Computer Vision, Feb. 2007, vol. 71, Issue 2, abstract, 2 pages.

(56) References Cited

OTHER PUBLICATIONS

Oettershagen, Philipp et al.; "Robotic technologies for solar-powered UAVs: Fully autonomous updraft-aware aerial sensing for multiday search-and-rescue missions", Journal of Field Robotics, Jun. 2018, vol. 35, Issue 4, abstract, 1 page.
Jamrozik, Wojciech et al; "Application of fused visual and thermal images in monitoring and evaluation of welding processes", Welding International, Jun. 2015, vol. 29, Issue 6, abstract, 1 page.
Liao, Qixiang et al.; "Parameter Estimation of Nonlinear Systems by Dynamic Cuckoo Search", Neural Computation, Apr. 2017, vol. 29, Issue 4, abstract, 1 page.
Hermosilla, Gabriel et al; "Fusion of Visible and Thermal Descriptors Using Genetic Algorithms for Face Recognition Systems", Sensors (14248220), Aug. 2015, vol. 15, Issue 8, abstract, 1 page.
Shunzhi, Zhu et al; "Image feature detection algorithm based on the spread of Hessian source", Multimedia Systems, Feb. 2017, vol. 23, Issue 1, abstract, 1 page.
Zhu, J. et al.; "Interfacial Residual Stress Analysis of Thermal Spray Coatings by Miniature Ring-Core Cutting Combined with DIC Method", Experimental Mechanics, Feb. 2014, vol. 54, Issue 2, abstract, 1 page.
USPTO Patent Applications Database; abstract of U.S. Appl. No. 15/178,513; title: image retrieval and processing systems and methods; applicant: FLIR Systems AB; inventor: Martin Solli; filed Jun. 9, 2016, 1 page.
Scott, Spencer M. et al.; "The thermal stability and consolidation of perovskite variant $Cs_2SnCI_6$ using spark plasma sintering", Journal of the American Ceramic Society; May 2018, vol. 101, Issue 5, abstract, 1 page.
Zhang, Hu et al.; "Theoretical accuracy of anisotropic thermal conductivity determined by transient plane source method", International Journal of Heat and Mass Transfer; May 2017, 108 Part B; abstract, 1 page.
Valdramidis, Vasilis P. et al.; "Novel Thermal and Non-Thermal Technologies for Fluid Foods"; Food Science and Technology, International Series Amsterdam: Academic Press, 2012, abstract 1 page.
Dupre, Jean-Christophe et al.; "Detection of cracks in refractory materials by an enhanced digital image correlation technique", Journal of Materials Science, Jan. 2018, vol. 53, Issue 2, abstract, 2 pages.
Jimenez, Castro et al.; "Thermal Image Sensing Model for Robotic Planning and Search", Sensors; published Aug. 8, 2016; vol. 16, 1253; doi 10.3390/s16081253; 27 pages.
International Search Report dated Sep. 4, 2019 issued in connection with PCT/US2019/037027 filed Jun. 13, 2019, 3 pages.

\* cited by examiner

METHODS AND SYSTEMS FOR THERMAL IMAGE DISPLAY

BACKGROUND

Many manufactured products need to be repaired on occasion. Thermal imaging devices can be used to inspect such products by identifying thermal anomalies exhibited during use. Visible light cameras can also be useful for inspection purposes, but some difficulties can arise when attempting to use both visible light images and thermal images of such a product for inspection purposes.

SUMMARY

One aspect of the disclosure is an imaging device that includes one or more processors; a first camera having a first field of view that is aligned with a first optical axis; and a second camera having a second field of view that is aligned with a second optical axis that is not collinear with the first optical axis. The second field of view encompasses the first field of view at an object plane that is separated from the first camera by at least a threshold distance. The first field of view extends beyond the second field of view in at least one direction at an object plane that is closer to the first camera than the threshold distance. The imaging device also includes a display; and a computer readable medium storing instructions that, when executed by the one or more processors, cause the imaging device to perform functions. The functions include capturing, via the first camera, a first image having a first pixel density, where a pixel of the first image that corresponds to the first optical axis is substantially centered within the first image. The functions further include capturing, via the second camera, a second image having a second pixel density that is greater than the first pixel density, where a pixel of the second image that corresponds to the first optical axis is off-center within the second image. The functions further include processing the first image to generate a third image and processing the second image to generate a fourth image such that a pixel of the fourth image that corresponds to the first optical axis is substantially centered within the fourth image, where a pixel density of the third image is substantially equal to a pixel density of the fourth image, and wherein the fourth image represents a field of view that is substantially equal to a field of view represented by the third image.

Another aspect of the disclosure is a non-transitory computer readable medium storing instructions that, when executed by an imaging device, cause the imaging device to perform functions. The functions include capturing, via a first camera of the imaging device, a first image having a first pixel density, where a pixel of the first image that corresponds to a first optical axis of the first camera is substantially centered within the first image. The functions further include capturing, via a second camera of the imaging device, a second image having a second pixel density that is greater than the first pixel density, where a pixel of the second image that corresponds to the first optical axis is off-center within the second image. The functions further include processing the first image to generate a third image and processing the second image to generate a fourth image such that a pixel of the fourth image that corresponds to the first optical axis is substantially centered within the fourth image, where a pixel density of the third image is substantially equal to a pixel density of the fourth image, and wherein the fourth image represents a field of view that is substantially equal to a field of view represented by the third image.

Another aspect of the disclosure is a method. The method includes capturing, via a first camera of the imaging device, a first image having a first pixel density, where a pixel of the first image that corresponds to a first optical axis of the first camera is substantially centered within the first image. The method further includes capturing, via a second camera of the imaging device, a second image having a second pixel density that is greater than the first pixel density, where a pixel of the second image that corresponds to the first optical axis is off-center within the second image. The method further includes processing the first image to generate a third image and processing the second image to generate a fourth image such that a pixel of the fourth image that corresponds to the first optical axis is substantially centered within the fourth image, where a pixel density of the third image is substantially equal to a pixel density of the fourth image, and wherein the fourth image represents a field of view that is substantially equal to a field of view represented by the third image.

Another aspect of the disclosure is an imaging device that includes one or more processors; a first camera having a first field of view that is aligned with a first optical axis; a second camera having a second field of view that is aligned with a second optical axis that is not collinear with the first optical axis, where the second field of view encompasses the first field of view at an object plane that is separated from the first camera by at least a threshold distance, where the first field of view extends beyond the second field of view in at least one direction at an object plane that is closer to the first camera than the threshold distance; a display; and a computer readable medium storing instructions that, when executed by the one or more processors, cause the imaging device to perform functions. The functions include capturing, via the first camera, a first image having a first pixel density, wherein a pixel of the first image that corresponds to the first optical axis is substantially centered within the first image; and capturing, via the second camera, a second image having a second pixel density that is greater than the first pixel density, where a pixel of the second image that corresponds to the first optical axis is off-center within the second image. The functions further include processing the first image to generate a third image and processing the second image to generate a fourth image such that a pixel of the fourth image that corresponds to the first optical axis is substantially centered within the fourth image, wherein a pixel density of the third image is substantially equal to a pixel density of the fourth image, and wherein the fourth image represents a field of view that is narrower than a field of view represented by the third image.

Another aspect of the disclosure is a non-transitory computer readable medium storing instructions that, when executed by an imaging device, cause the imaging device to perform functions. The functions include capturing, via a first camera of the imaging device, a first image having a first pixel density, wherein a pixel of the first image that corresponds to the first optical axis is substantially centered within the first image; and capturing, via a second camera of the imaging device, a second image having a second pixel density that is greater than the first pixel density, where a pixel of the second image that corresponds to the first optical axis is off-center within the second image. The functions further include processing the first image to generate a third image and processing the second image to generate a fourth image such that a pixel of the fourth image that corresponds to the first optical axis is substantially centered within the fourth image, wherein a pixel density of the third image is substantially equal to a pixel density of the fourth image, and wherein the fourth image represents a field of view that is narrower than a field of view represented by the third image.

Another aspect of the disclosure is a method. The method includes capturing, via a first camera of the imaging device, a first image having a first pixel density, wherein a pixel of the first image that corresponds to the first optical axis is substantially centered within the first image; and capturing, via a second camera of the imaging device, a second image having a second pixel density that is greater than the first pixel density, where a pixel of the second image that corresponds to the first optical axis is off-center within the second image. The method further includes processing the first image to generate a third image and processing the second image to generate a fourth image such that a pixel of the fourth image that corresponds to the first optical axis is substantially centered within the fourth image, wherein a pixel density of the third image is substantially equal to a pixel density of the fourth image, and wherein the fourth image represents a field of view that is narrower than a field of view represented by the third image.

Another aspect of the disclosure is an imaging device that includes one or more processors; a first camera having a first field of view that is aligned with a first optical axis; a second camera having a second field of view that is aligned with a second optical axis that is not collinear with the first optical axis, wherein the second field of view encompasses the first field of view at an object plane that is separated from the first camera by at least a threshold distance, wherein the first field of view extends beyond the second field of view in at least one direction at an object plane that is closer to the first camera than the threshold distance; a display; and a computer readable medium storing instructions that, when executed by the one or more processors, cause the imaging device to perform functions. The functions include capturing, via the first camera, a first image having a first pixel density, wherein a pixel of the first image that corresponds to the first optical axis is substantially centered within the first image; capturing, via the second camera, a second image having a second pixel density that is greater than the first pixel density, wherein a pixel of the second image that corresponds to the first optical axis is off-center within the second image; processing the second image to generate a fourth image such that a pixel of the fourth image that corresponds to the first optical axis is substantially centered within the fourth image, wherein a pixel density of the first image is substantially equal to a pixel density of the fourth image, and wherein the fourth image represents a field of view that is substantially equal to field of view represented by the first image.

Another aspect of the disclosure is a non-transitory computer readable medium storing instructions that, when executed by an imaging device, cause the imaging device to perform functions. The functions include capturing, via a first camera of the imaging device, a first image having a first pixel density, wherein a pixel of the first image that corresponds to the first optical axis is substantially centered within the first image; capturing, via a second camera of the imaging device, a second image having a second pixel density that is greater than the first pixel density, wherein a pixel of the second image that corresponds to the first optical axis is off-center within the second image; processing the second image to generate a fourth image such that a pixel of the fourth image that corresponds to the first optical axis is substantially centered within the fourth image, wherein a pixel density of the first image is substantially equal to a pixel density of the fourth image, and wherein the fourth image represents a field of view that is substantially equal to field of view represented by the first image.

Another aspect of the disclosure is a method. The method includes capturing, via a first camera of the imaging device, a first image having a first pixel density, wherein a pixel of the first image that corresponds to the first optical axis is substantially centered within the first image; capturing, via a second camera of the imaging device, a second image having a second pixel density that is greater than the first pixel density, wherein a pixel of the second image that corresponds to the first optical axis is off-center within the second image; processing the second image to generate a fourth image such that a pixel of the fourth image that corresponds to the first optical axis is substantially centered within the fourth image, wherein a pixel density of the first image is substantially equal to a pixel density of the fourth image, and wherein the fourth image represents a field of view that is substantially equal to field of view represented by the first image.

Another aspect of the disclosure is an imaging device that includes one or more processors; a first camera having a first field of view that is aligned with a first optical axis; a second camera having a second field of view that is aligned with a second optical axis that is not collinear with the first optical axis, wherein the second field of view encompasses the first field of view at an object plane that is separated from the first camera by at least a threshold distance, wherein the first field of view extends beyond the second field of view in at least one direction at an object plane that is closer to the first camera than the threshold distance; a display; and a computer readable medium storing instructions that, when executed by the one or more processors, cause the imaging device to perform functions. The functions include capturing, via the first camera, a first image having a first pixel density, wherein a pixel of the first image that corresponds to the first optical axis is substantially centered within the first image; capturing, via the second camera, a second image having a second pixel density that is greater than the first pixel density, wherein a pixel of the second image that corresponds to the first optical axis is off-center within the second image; processing the second image to generate a fourth image such that a pixel of the fourth image that corresponds to the first optical axis is substantially centered within the fourth image, wherein a pixel density of the first image is substantially equal to a pixel density of the fourth image, and wherein the fourth image represents a field of view that is narrower than a field of view represented by first image.

Another aspect of the disclosure is a non-transitory computer readable medium storing instructions that, when executed by an imaging device, cause the imaging device to perform functions. The functions include capturing, via the first camera, a first image having a first pixel density, wherein a pixel of the first image that corresponds to the first optical axis is substantially centered within the first image; capturing, via the second camera, a second image having a second pixel density that is greater than the first pixel density, wherein a pixel of the second image that corresponds to the first optical axis is off-center within the second image; processing the second image to generate a fourth image such that a pixel of the fourth image that corresponds to the first optical axis is substantially centered within the fourth image, wherein a pixel density of the first image is substantially equal to a pixel density of the fourth image, and wherein the fourth image represents a field of view that is narrower than a field of view represented by first image.

Another aspect of the disclosure is a method. The method includes capturing, via the first camera, a first image having a first pixel density, wherein a pixel of the first image that corresponds to the first optical axis is substantially centered within the first image; capturing, via the second camera, a second image having a second pixel density that is greater than the first pixel density, wherein a pixel of the second image that corresponds to the first optical axis is off-center within the second image; processing the second image to generate a fourth image such that a pixel of the fourth image that corresponds to the first optical axis is substantially centered within the fourth image, wherein a pixel density of the first image is substantially equal to a pixel density of the fourth image, and wherein the fourth image represents a field of view that is narrower than a field of view represented by first image.

These as well as other aspects and advantages will become apparent to those of ordinary skill in the art by reading the following detailed description, with reference where appropriate to the accompanying drawings. Further, it should be understood that the embodiments described in this overview and elsewhere are intended to be examples only and do not necessarily limit the scope of the invention.

BRIEF DESCRIPTION OF THE DRAWINGS

Example embodiments are described herein with reference to the following drawings.

DETAILED DESCRIPTION

I. Introduction/Glossary

Although some of the example embodiments are described with respect to a vehicle, the example embodiments can be applicable to products or repairable items other than a vehicle. As an example, the other products or repairable items can include home appliances, such as a generator, a refrigerator, a dishwasher, a washing machine, or a consumer electronic device, such as a television, a cellular phone, or a tablet device. Other examples of the other products or repairable items are also possible. Accordingly, for embodiments based on these other products or repairable items, the term vehicle in the described embodiments can be replaced with a name of the other product or repairable item.

In this description, the articles "a" or "an" are used to introduce elements of the example embodiments. Any reference to "a" or "an" refers to "at least one," and any reference to "the" refers to "the at least one," unless otherwise specified, or unless the context clearly dictates otherwise. The intent of using those articles is that there is one or more of the elements. The intent of using the conjunction "or" within a described list of at least two terms is to indicate any of the listed terms or any combination of the listed terms. The use of ordinal numbers such as "first," "second," "third," and so on is to distinguish respective elements rather than to denote a particular order of those elements. For purpose of this description, the terms "multiple" and "a plurality of" refer to "two or more" or "more than one."

The block diagram(s) and flow chart(s) shown in the figures are provided merely as examples and are not intended to be limiting. Many of the elements illustrated in the figures or described herein are functional elements that can be implemented as discrete or distributed elements or in conjunction with other elements, and in any suitable combination and location. Those skilled in the art will appreciate that other arrangements and elements (e.g., machines, interfaces, functions, orders, or groupings of functions) can be used instead. Furthermore, various functions described as being performed by one or more elements of a machine described herein can be carried out by a processor executing computer-readable program instructions or by any combination of hardware, firmware, or software.

By the term "about" or "substantially" with reference to amounts or measurement values described herein, it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Figure 1:
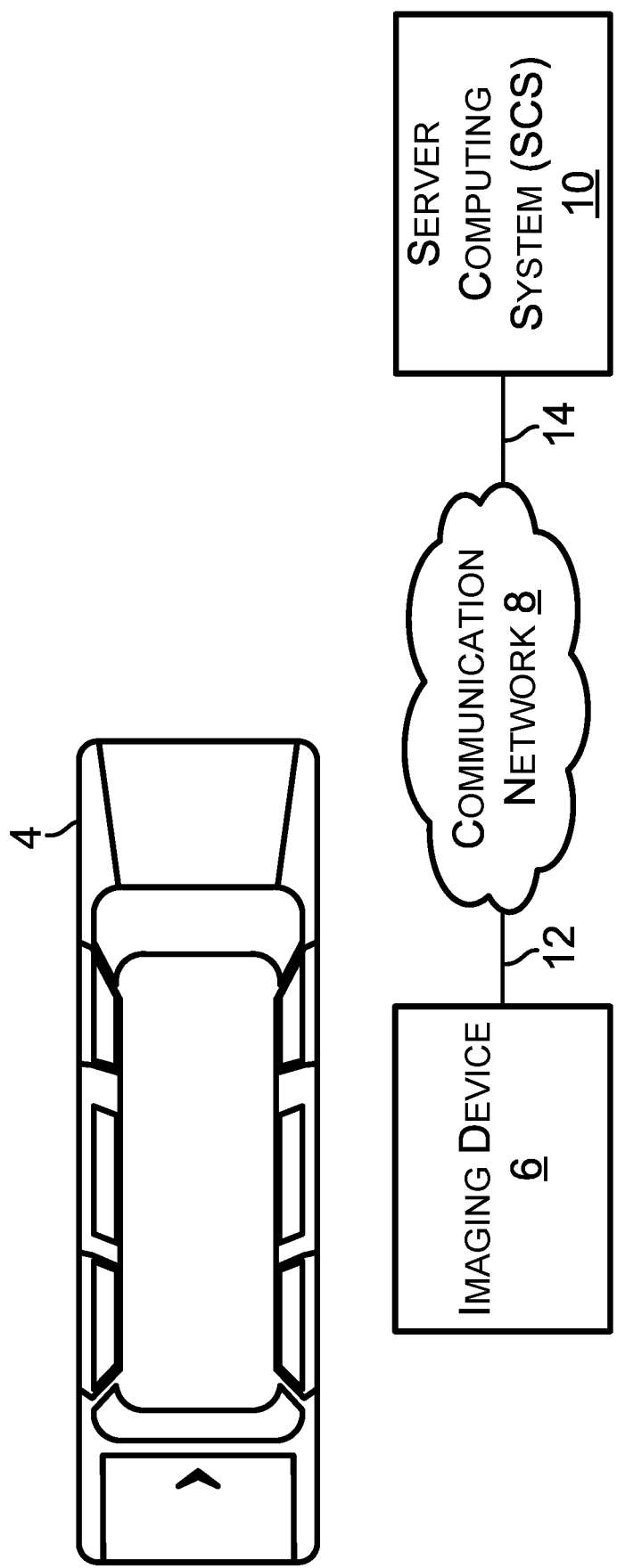
FIG. 1 is a block diagram of a thermal imaging device and a server computing system, according to an example embodiment.

Ptv=Vertical pixels (rows of pixels) of image 80
Pvv=Vertical pixels (rows of pixels) of image 84
Pth=Horizontal pixels (columns of pixels) of image 80
Pvh=Horizontal pixels (columns of pixels) of image 84
Spv=Pixels to shift/skip vertically
Sph=Pixels to shift/skip horizontally II. Example Architecture Referring to FIG. 1, a vehicle, such as the vehicle 4, is a mobile machine that can be used to transport a person, people, and/or cargo. A vehicle can be driven or otherwise guided along a path (e.g., a paved road or otherwise) on land, in water, or in the air or outer space. A vehicle can be wheeled, tracked, railed, or skied. A vehicle can be guided by a user within the vehicle or by a user outside of the vehicle by use of a remote control. A vehicle can be guide at least partially autonomously. In the case of an autonomous vehicle, the vehicle can at least sometimes be guided along a path without any person or cargo inside or on the vehicle. A vehicle can include an automobile, a motorcycle, an all-terrain vehicle (ATV) defined by ANSI/SVIA-1-2007, a snowmobile, a personal watercraft (e.g., a JET SKI® personal watercraft), a light-duty truck, a medium-duty truck, a heavy-duty truck, a semi-tractor, a farm machine, a van (such as a dry or refrigerated van), a tank trailer, a platform trailer, a drone, or an automobile carrier. A vehicle can include or use any appropriate voltage or current source, such as a battery, an alternator, a fuel cell, and the like. A vehicle can include or use any desired drive system or engine. That drive system or engine can include items that use fossil fuels, such as gasoline, natural gas, propane, and the like, electricity, such as that generated by a battery, magneto, fuel cell, solar cell and the like, wind and hybrids or combinations thereof.

A vehicle manufacturer can build various quantities of vehicles each calendar year (i.e., January $1^{st}$ to December $31^{st}$). In some instances, a vehicle manufacturer defines a model year for a particular vehicle model to be built. The model year can start on a date other than January $1^{st}$ and/or can end on a date other than December $31^{st}$. The model year can span portions of two calendar years. A vehicle manufacturer can build one vehicle model or multiple different vehicle models. Two or more different vehicle models built by a vehicle manufacturer during a particular calendar year can have the same of different defined model years. The vehicle manufacturer can build vehicles of a vehicle model with different vehicle options. For example, the particular vehicle model can include vehicles with six-cylinder engines and vehicles with eight-cylinder engines. The vehicle manufacturer or another entity can define vehicle identifying information for each vehicle built by the vehicle manufacturer. Particular vehicle identifying information identifies particular sets of vehicles (e.g., all vehicles of a particular vehicle model for a particular vehicle model year or all vehicles of a particular vehicle model for a particular vehicle model year with a particular set of one or more vehicle options).

As an example, the particular vehicle identifying information can include indicators of characteristics of the vehicle such as when the vehicle was built (e.g., a vehicle model year), who built the vehicle (e.g., a vehicle make (i.e., vehicle manufacturer)), marketing names associated with vehicle (e.g., a vehicle model name, or more simply "model"), and features of the vehicle (e.g., an engine type). In accordance with that example, the particular vehicle identifying information can be referred to by an abbreviation YMME or Y/M/M/E, where each letter in the order shown represents a model year identifier, vehicle make identifier, vehicle model name identifier, and engine type identifier, respectively, or an abbreviation YMM or Y/M/M, where each letter in the order shown represents a model year identifier, vehicle make identifier, and vehicle model name identifier, respectively. An example Y/M/M/E is 2004/Toyota/Camry/4Cyl, in which "2004" represents the model year the vehicle was built, "Toyota" represents the name of the vehicle manufacturer Toyota Motor Corporation, Aichi Japan, "Camry" represents a vehicle model built by that manufacturer, and "4Cyl" represents a an engine type (i.e., a four cylinder internal combustion engine (ICE)) within the vehicle. A person skilled in the art will understand that other features (such as a vehicle system) in addition to or as an alternative to "engine type" can be used to identify a vehicle using particular vehicle identifying information, and for some purposes, a vehicle could be identified by its make and model M/M or YMMS or YMMES, where the "S" represents the vehicle system. These other features can be identified in various manners, such as a regular production option (RPO) code, such as the RPO codes defined by the General Motors Company LLC, Detroit Mich.

A vehicle communication link within the vehicle 4 can include one or more conductors (e.g., copper wire conductors) or can be wireless. As an example, the vehicle communication link can include one or more conductors for carrying vehicle data messages in accordance with a vehicle data message (VDM) protocol. A VDM protocol can include a Society of Automotive Engineers (SAE)® J1850 (PWM or VPW) VDM protocol, an International Organization of Standardization (ISO)® 15764-4 controller area network (CAN) VDM protocol, an ISO® 9141-2 K-Line VDM protocol, an ISO® 14230-4 KWP2000 K-Line VDM protocol, an ISO® 17458 (e.g., parts 1-5) FlexRay VDM protocol, an ISO® 17987 local interconnect network (LIN) VDM protocol, a MOST® Cooperation VDM protocol (such as the MOST Specification Rev. 3.0 E2, or the MOST® Dynamic Specification, Rev. 3.0.2), or some other VDM protocol defined for performing communications with or within the vehicle 4.

The imaging device 6 can be used to capture and display thermal images and/or visible light images of components of the vehicle 4. Additionally or alternatively, the imaging device 6 can be used to capture and display thermal images and/or visible light images of other objects, such as a house, a building or a component or system of a house or building (e.g., a heating, ventilation, and air conditioning component or system). The imaging device 6 can take the form of a computing device and be configured for communication with the server computing system (SCS) 10 via communication links 12 and 14, and communication network 8. The imaging device 6 is depicted in further detail in FIG. 2.

The communication network 8 can include one or more computing devices networked via a wide-area network or a local area network. The communication network 8 can take the form of the internet, for example. As such, the communication links 12 and 14 can take the form of wired (e.g., Ethernet) or wireless (e.g., BLUETOOTH®, WI-FI®, etc.) communication links.

The SCS 10 can take the form of one or more computing devices (e.g., a server). In some examples, the SCS 10 can store various information useful for repairing vehicles taking the form of various Y/M/M.

Figure 2:
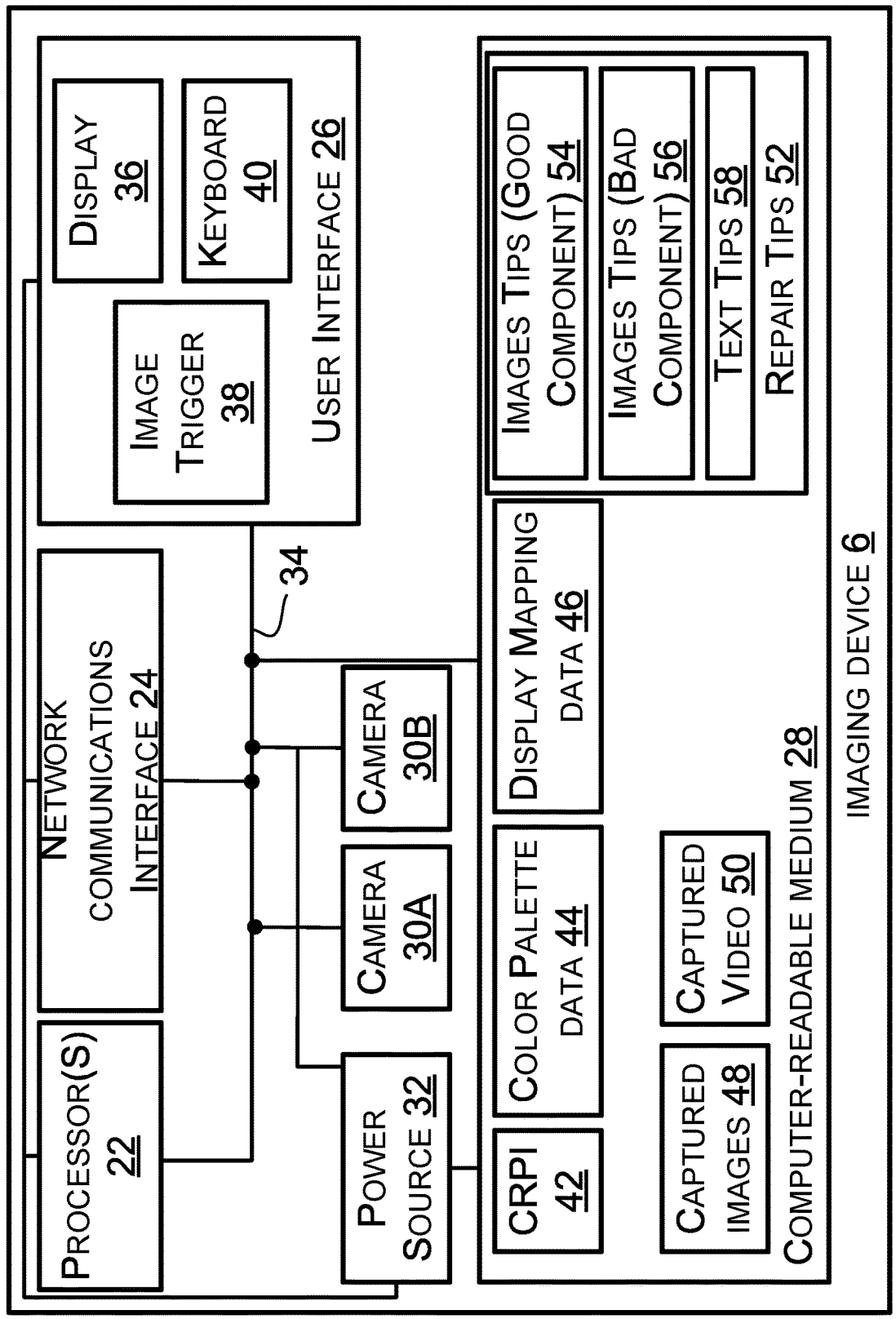
FIG. 2 is a block diagram of an imaging device, according to an example embodiment.

The imaging device 6 is depicted in FIG. 2. As shown in FIG. 2, the imaging device 6 includes a processor 22, a network communication interface 24, a user interface 26, a computer-readable medium 28, a camera 30A, a camera 30b, a power source 32, a data bus 34, and a power bus 20. A processor such as the processor(s) 22 or any other processor discussed in this description can include one or more processors. A processor can include a general purpose processor (e.g., an INTEL® single core microprocessor or an INTEL® multicore microprocessor), or a special purpose processor (e.g., a digital signal processor, a graphics processor, or an application specific integrated circuit (ASIC) processor). A processor can be configured to execute computer-readable program instructions (CRPI). For example, the processor 22 can execute CRPI 42 stored in the computer-readable medium (CRM) 28. A processor can be configured to execute hard-coded functionality in addition to or as an alternative to software-coded functionality (e.g., via CRPI).

The at least one processor of the processor 22 can be programmed to perform any function or combination of functions described herein as being performed by the imaging device 6.

A computer-readable medium such as the CRM 28 or any other CRM discussed in this description can include one or more CRM. A CRM can include a non-transitory CRM, a transitory CRM, or both a non-transitory CRM and a transitory CRM. A non-transitory CRM, or a portion thereof, can be located within or as part of a processor (e.g., within a single integrated circuit chip). A non-transitory CRM, or a portion thereof, can be separate and distinct from a processor.

A non-transitory CRM can include a volatile or non-volatile storage component, such as an optical, magnetic, organic or other memory or disc storage component. Additionally or alternatively, a non-transitory memory can include or be configured as a random-access memory (RAM), a read-only memory (ROM), a programmable read-only memory (PROM), an erasable programmable read-only memory (EPROM), an electrically erasable programmable read-only memory (EEPROM), flash memory, a hard disk drive, a Compact Disc (CD), a Digital Video Disk (DVD), a CD read-only memory (CD-ROM), or other optical storage, magnetic cassettes, magnetic tape, magnetic disk storage or other magnetic storage devices, or any other medium which can be used to store the desired information and which can be accessed by a processor and/or a memory controller. The RAM can include static RAM or dynamic RAM.

A transitory CRM can include, for example, CRPI provided over a communication link, such as the communication link 12 which is connected to or is part of the communication network 8. The communication link 12 can include a digital or analog communication link. The communication link can include a wired communication link including one or more wires or conductors, or a wireless communication link including an air interface.

A computer-readable medium can be referred to by other terms such as a "computer-readable storage medium," a "data storage device," a "memory device," a "memory," "computer-readable media," a "computer-readable database," "at least one computer-readable medium," or "one or more computer-readable medium." Any of those alternative terms can be preceded by the prefix "transitory" if the CRM is transitory or "non-transitory" if the CRM is non-transitory.

The CRM 28 can include CRPI 42, color palette data 44, display mapping data 46, captured images 48, and captured video 50. The CRM 28 can also include repair tips 52 which can include image tips (good component) 54, image tips (bad component), and text tips 58.

The color palette data 44 can include one or more color palettes for mapping temperatures (e.g., wavelengths) represented by thermal image data to brightness levels and/or colors, as is known in the art. For example, a first color palette can map temperatures to various shades of orange and/or levels of brightness, whereas a second color palette can map temperatures to various shades of purple and/or levels of brightness.

Display mapping data 46 can include templates for displaying thermal images simultaneously with information related to servicing vehicles. For example, the user can select one of many display templates such that a thermal image of a vehicle and information related to servicing the vehicle are displayed at various relative locations within the display 36 (e.g. a liquid crystal display or other type of electronic display) based on the selected display template.

The captured images 48 can include image data corresponding to thermal images captured by the imaging device 6. The captured video 50 can include image data corresponding to thermal images captured as a video stream by the imaging device 6.

The image tips 54 can include images that are captured by the imaging device 6 and/or images that are received from the SCS 10. The image tips 54 can include thermal images of vehicle components that are known to be in good working order. The image tips 56 can include images that are captured by the imaging device 6. The image tips 56 can include thermal images of vehicle components that are known to be malfunctioning in one way or another. The imaging device 6 can receive the image tips 56 from the SCS 10. The SCS 10 can provide images tips 54 and/or image tips 56 in response to a request for images tips from the imaging device 6. The request for image tips can include a Y/M/M or Y/M/M/E of a vehicle to be diagnosed using the imaging device 6.

The text tips 58 can include textual suggestions for repairing vehicle components. For example, a user can navigate a menu displayed by the user interface 26 and choose text tips 58 that correspond to a particular component of a vehicle that is suspected of malfunctioning. The imaging device 6 can receive the text tips from the SCS 10 in response to a request for text tips from the imaging device 6. The request for text tips can include a Y/M/M or Y/M/M/E of a vehicle to be diagnosed using the imaging device 6.

A network communications interface 24 can comprise a transceiver and a receiver. A transceiver can comprise one or more transceivers. Each transceiver can include one or more transmitters configured to transmit data onto a network, such as the communication network 8. Each transceiver can include one or more receivers configured to receive data carried over a network, such as the communication network 8. The data transmitted or received by a transceiver can comprise any data (e.g., repair tips, images, video, image tips, or text tips) discussed in this description or any combination thereof.

A transmitter can transmit radio signals carrying data and a receiver can receive radio signals carrying data. A transceiver with that transmitter and receiver can include one or more antennas and can be referred to as a "radio transceiver," an "RF transceiver," or a "wireless transceiver." The radio signals transmitted or received by a radio transceiver can be arranged in accordance with one or more wireless communication standards or protocols such as an Institute of Electrical and Electronics Engineers (IEEE) standard, such as (i) an IEEE 802.11 standard for wireless local area networks (wireless LAN) (which is sometimes referred to as a WI-FI® standard) (e.g., 802.11a, 802.11b, 802.11g, 802.11n, 802.11ac, 802.11ad, 802.11af, 802.11ag, 802.11ah, 802.11ai, 802.11aj, 802.11aq, 802.11ax, or 802.11ay), (ii) an IEEE 802.15 standard (e.g., 802.15.1, 802.15.3, 802.15.4 (ZigBee), or 802.15.5) for wireless personal area networks (PANs), (iii) a BLUETOOTH® version 4.1 or 4.2 standard developed by the Bluetooth Special Interest Group (SIG) of Kirkland, Wash., (iv) a cellular wireless communication standard such as a long term evolution (LTE) standard, (v) a code division multiple access (CDMA) standard, (vi) an integrated digital enhanced network (IDEN) standard, (vii) a global system for mobile communications (GSM) standard, (viii) a general packet radio service (GPRS) standard, (ix) a universal mobile telecommunications system (UMTS)

standard, (x) an enhanced data rates for GSM evolution (EDGE) standard, (xi) a multichannel multipoint distribution service (MMDS) standard, (xii) an International Telecommunication Union (ITU) standard, such as the ITU-T G.9959 standard referred to as the Z-Wave standard, (xiii) a 6LoWPAN standard, (xiv) a Thread networking protocol, (xv) an International Organization for Standardization (ISO/International Electrotechnical Commission (IEC) standard such as the ISO/IEC 18000-3 standard for Near Field Communication (NFC), (xvi) the Sigfox communication standard, (xvii) the Neul communication standard, or (xviii) the LoRaWAN communication standard. Other examples of the wireless communication standards or protocols are possible.

Additionally or alternatively, a transmitter can transmit a signal (i.e., one or more signals or one or more electrical waves) carrying or representing data onto a wire (e.g., one or more wires) and a receiver can receive via a wire a signal carrying or representing data over the wire. The wire can be part of a network, such as the communication network 8. The signal carried over a wire can be arranged in accordance with a wired communication standard such as a Transmission Control Protocol/Internet Protocol (TCP/IP), an IEEE 802.3 Ethernet communication standard for a LAN, a data over cable service interface specification (DOC SIS standard), such as DOC SIS 3.1, a universal serial bus (USB) specification, or some other wired communication standard.

The data transmitted by a transceiver can include a destination identifier or address of a system component to which the data is to be transmitted. The data transmitted by a transceiver can include a source identifier or address of the system component including the transceiver. The source identifier or address can be used to send a response to the system component that includes the transceiver that sent the data.

The network communications interface 24 can include a modem, a network interface card, and/or a chip mountable on a circuit board. As an example the chip can comprise a CC3100 WI-FI® network processor available from Texas Instruments, Dallas, Tex., a CC256MODx BLUETOOTH® Host Controller Interface (HCI) module available from Texas instruments, and/or a different chip for communicating via WI-FI®, BLUETOOTH® or another communication protocol.

The camera 30A can take the form of a thermal imaging camera (e.g., an infrared camera). The camera 30A can include one or more thermal image sensors (e.g., a bolometer or a thermopile infrared array sensor) and/or one or more other infrared wave guiding elements that are known in the art.

The camera 30B can take the form of a visible light camera. The camera 30B can include one or more image sensors such as a charge-coupled device (CCD) image sensor or a complementary metal oxide semiconductor (CMOS) image sensor, one or more lenses, and/or one or more other optical elements that are known in the art. In some embodiments, a depth of field of the camera 30A is less than a depth of field of the second camera 30B.

The power source 32 can be configured in any of a variety of configurations or combinations of the variety of configurations. As an example, the power source 32 can include circuitry to receive AC current from an AC electrical supply (e.g., electrical circuits connected to an electrical wall outlet) and convert the AC current to a DC current for supplying to one or more of the components within the imaging device 6. As another example, the power source 32 can include an energy storage device, such as a battery, or be battery operated. As yet another example, the power source 32 can include a solar cell or be solar operated. The power source 32 can include a power bus 20 and/or electrical circuits operatively connected to the power source 32 in order to distribute electrical current for powering components of the imaging device 6. As an example, the power bus 20 can include a copper foil trace of a printed circuit board, a wire, or some other electrical conductor. Other examples of the power source 32 and the power bus 20 are possible.

The user interface 26 can include a display 36, an image trigger 38, and/or a keyboard 40. The display 36 can include a capacitive touch screen display, a resistive touch screen display, a plasma display, an LED display, a cathode ray tube display, an OLED display, and/or an LCD. The display 36 can include a touch screen display with the LCD. For instance, the display 36 can include a capacitive (such as a projective capacitive) touch screen display or a resistive touch screen display. Other examples of the display 36 are possible.

The image trigger 38 can, but need not necessarily, include a trigger button. The processor 22 can determine different operating modes for the imaging device 6 based on a current operating mode of the imaging device 7 and use of the image trigger 38. For example, when the imagining device 6 is operating in a live mode (e.g., a mode showing an output of the cameras 30A, 30B) and not capturing a video or image, a short press of the image trigger 38 can cause the processor 22 and/or the cameras 30A, 30B to capture an image from each of the cameras 30A, 30B. As another example, when the imaging device 6 is operating in the live mode and not capturing a video or image, a long press of the image trigger 38 can cause the processor 22 and/or the cameras 30A, 30B to capture a video from each of the cameras 30A, 30B. As an example, a short press can be a press of the image trigger 38 for a length of time greater than 0.0 seconds and less than or equal to 1.5 seconds, and a short press can be a press of the image trigger 38 for more than 1.5 seconds. As yet another example, a short press or long press of the image trigger 38 while the processor 22 and/or the cameras 30A, 30B are capturing videos can cause the processor 22 and/or the cameras 30A, 30B to stop the cameras 30A, 30 from capturing the videos. The processor 22 can be configured to stop the cameras 30A, 30B from capturing the videos after a given length of time (e.g., 20 seconds) if the processor 22 does not detect use of the image trigger 38 during the first 20 seconds of capturing the videos.

The keyboard 40 can include a hardware keyboard with a set of numeric keys, alpha-numeric keys, and/or alphabet keys.

Figure 3:
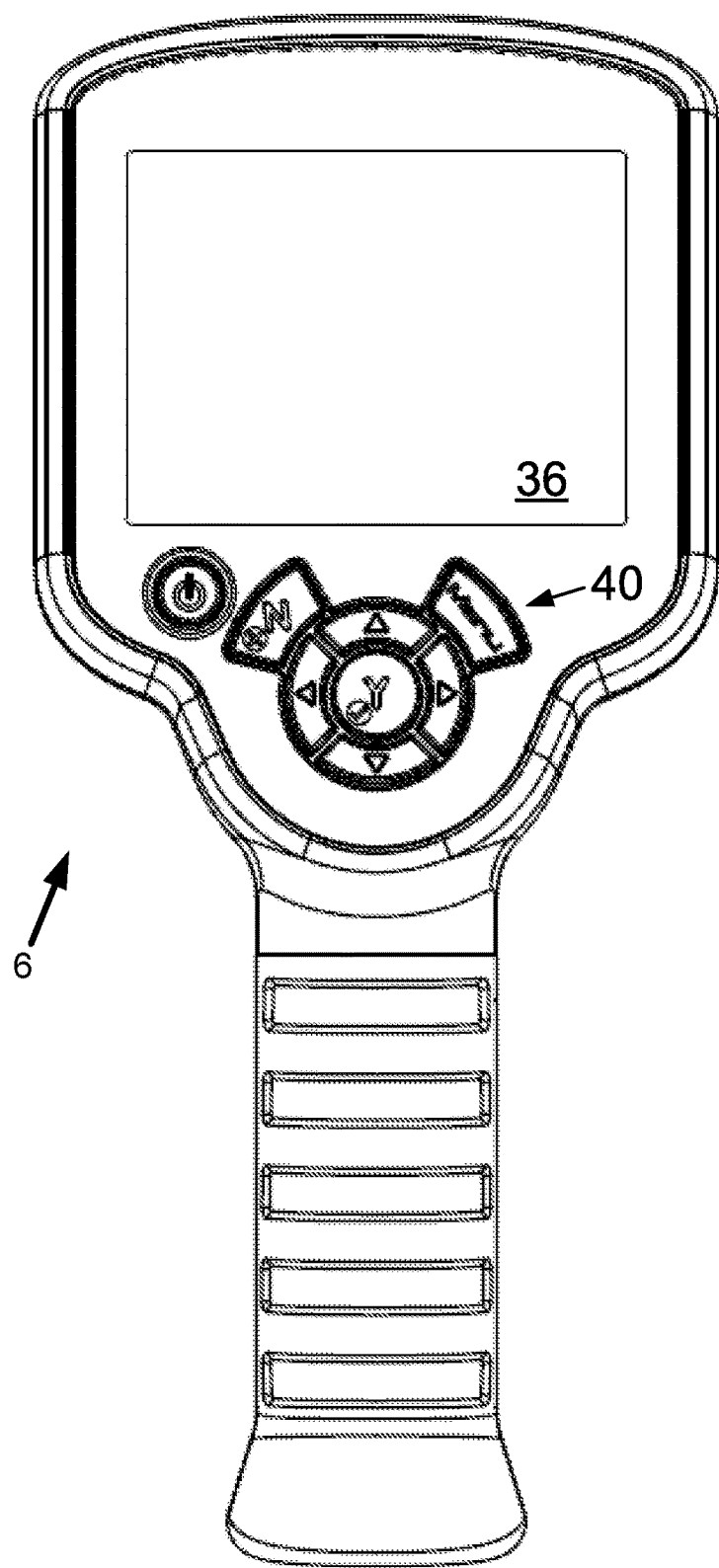
FIG. 3 is a rear view of an imaging device, according to an example embodiment
Figure 4:
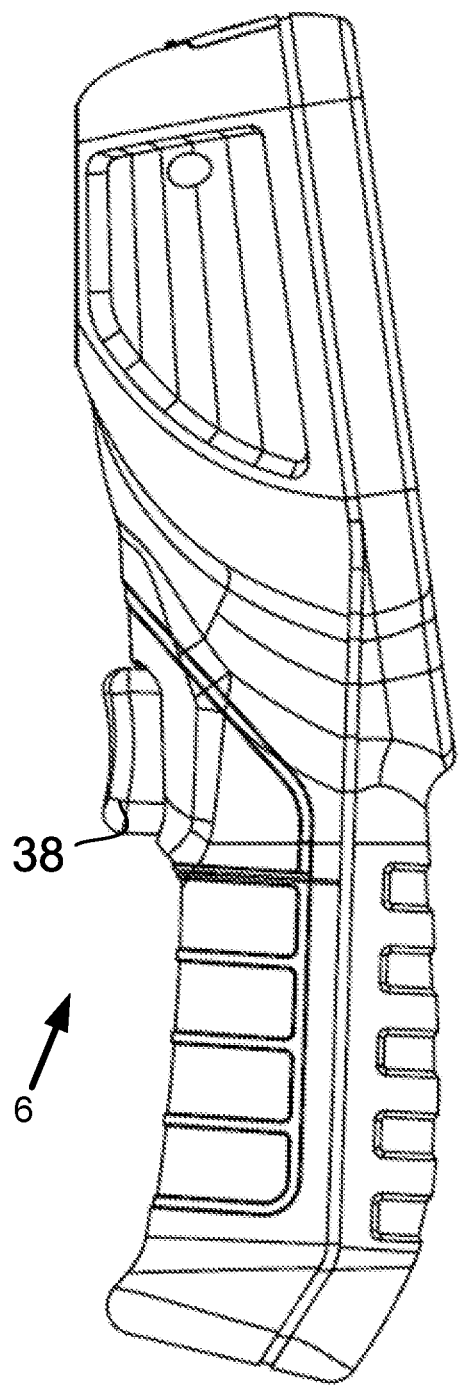
FIG. 4 is a side view of an imaging device, according to an example embodiment.
Figure 5:
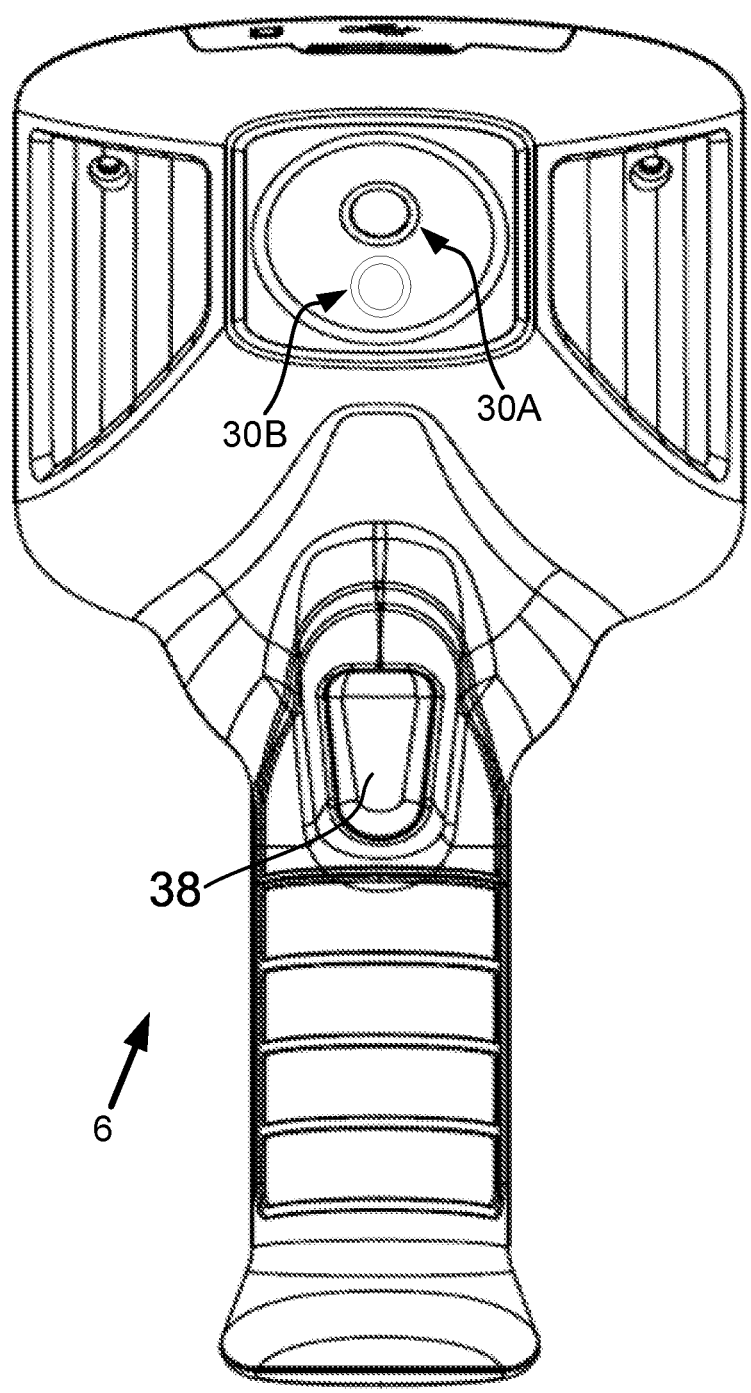
FIG. 5 is a front view of a thermal imaging device.

FIG. 3 depicts a rear view of an example implementation of the imaging device 6. FIG. 4 depicts a side view of the example implementation of the imaging device 6. FIG. 5 depicts a front view of the example implementation of the imaging device 6, showing the camera 30A positioned above the camera 30B.

Figure 6:
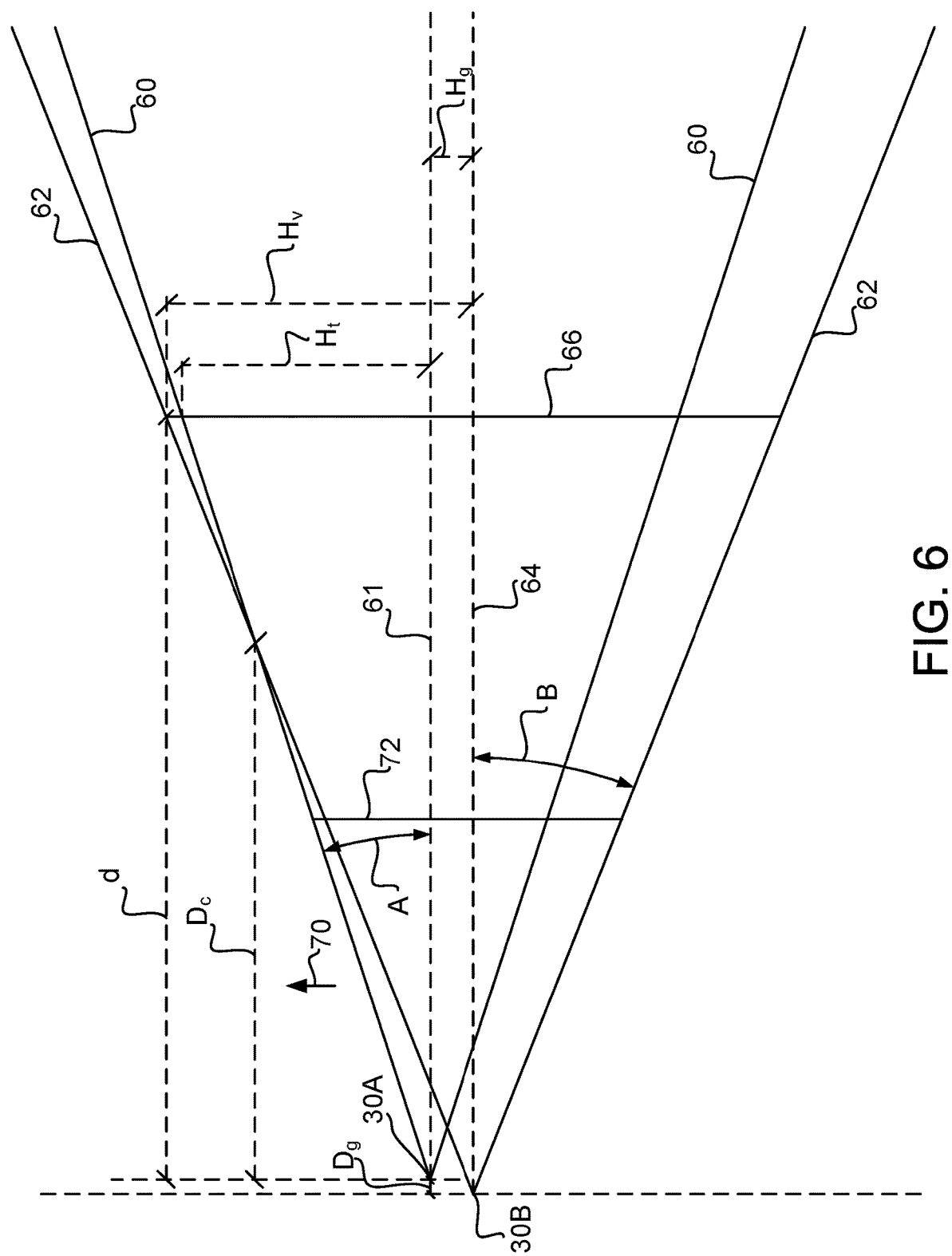
FIG. 6 is a schematic diagram illustrating cameras of an imaging device having different fields of view, according to an example embodiment.

FIG. 6 is a schematic diagram illustrating the camera 30A having a field of view 60 and the camera 30B having a field of view 62. The field of view 60 is defined by a (vertical) half-angle A (and perhaps also a horizontal half-angle that is not shown), and the field of view 62 is defined by a (vertical) half angle B (and perhaps also a horizontal half-angle that is not shown). The field of view 60 and the field of view 62 effectively have rectangular shapes due to the image sensors of the respective cameras 30A and 30B generally being arranged as a rectangular array (e.g., rows and columns) of pixels.

The distance d represents a distance between an object plane 66 and the camera 30A. The threshold distance $D_c$ represents a distance from the camera 30A past which an upper portion of the field of view 62 extends beyond an upper portion of the field of view 60 (e.g., in the direction 70). The distance $D_g$ represents a distance between the camera 30A and the camera 30B along the optical axis 61 of the camera 30A and/or the optical axis 64 of the camera 30B.

The height $H_t$ represents half of the height of the field of view 60 at the object plane 66. The height represents half of the height of the field of view 62 at the object plane 66. The height Hg represents the vertical distance between the camera 30A and the camera 30B, which is equivalent to the distance between the optical axis 61 and the optical axis 64 when the optical axis 61 and the optical axis 64 are in parallel as shown in FIG. 6.

The field of view 60 extends beyond the field of view 62 in at least the direction 70 at an object plane 72 that is closer to the camera 30A than the threshold distance $D_c$.

III. Example Operation

FIGS. 7-10 are flowcharts depicting respective methods 700, 800, 900, and 950 that can be carried out in accordance with one or more example embodiments described herein. The method 700 includes the functions shown in blocks 702, 704, 706, and 708. The method 800 includes the functions shown in blocks 802, 804, 806, and 808. The method 900 includes the functions shown in blocks 902, 904, and 906. The method 950 includes the functions shown in blocks 952, 954, and 956. A variety of methods can be performed using one or more of the functions shown in the methods 700, 800, 900, or 950 and one or more other functions described herein. Reference numbers included within the descriptions of FIGS. 7-10 are provided as examples, rather than to limit the description to only the particular configuration(s) including the components associated with the reference numbers.

In the context of the methods 700, 800, 900, and 950, a first camera of the imaging device has a field of view that is aligned with a first optical axis and a second camera of the imaging device has a second field of view that is aligned with a second optical axis that is not collinear with the first optical axis. The second field of view encompasses the first field of view at an object plane that is separated from the first camera by at least a threshold distance. The first field of view extends beyond the second field of view in at least one direction at an object plane that is closer to the first camera than the threshold distance.

Figure 7:
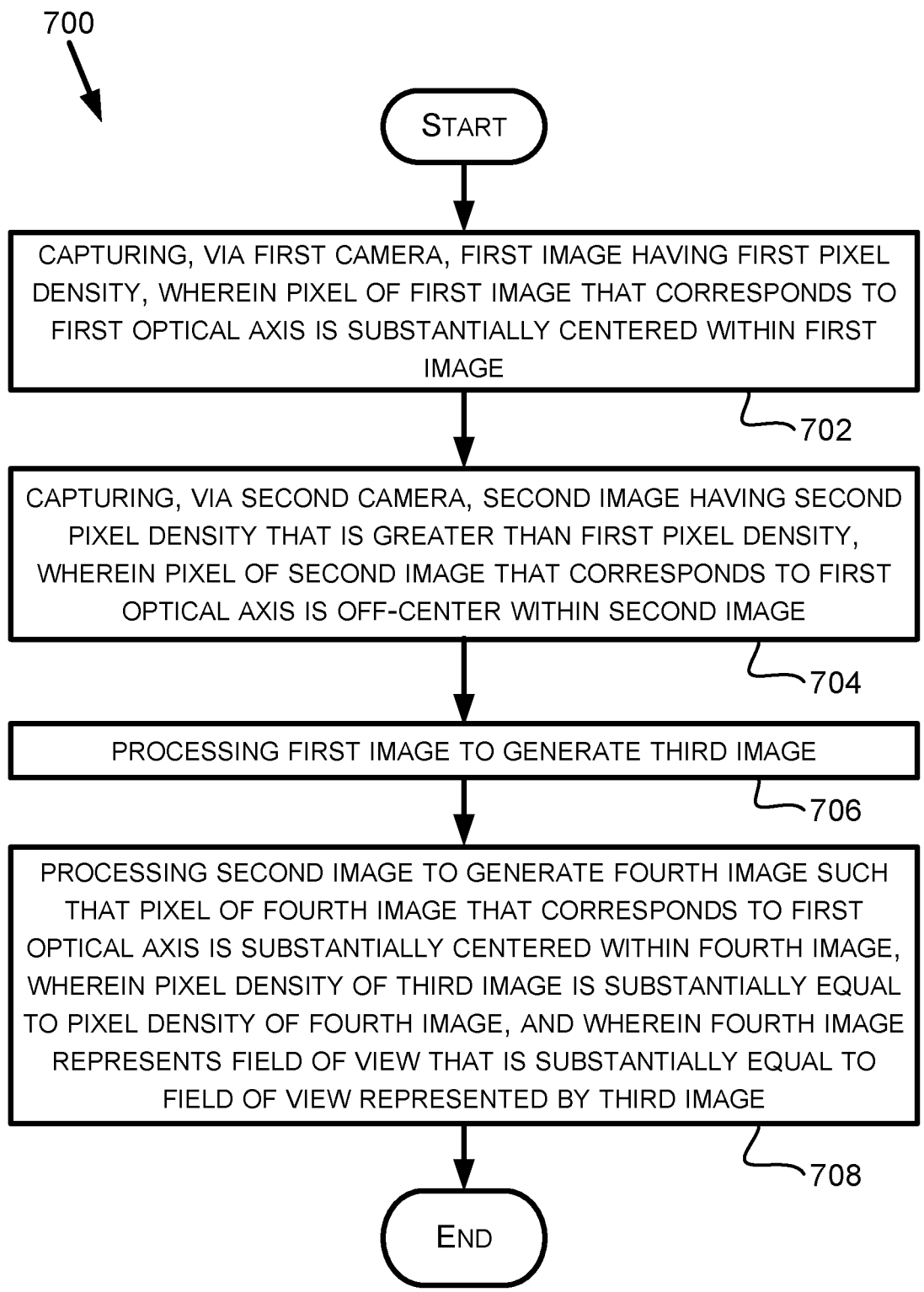
FIG. 7 is a block diagram of a method, according to an example embodiment.

Referring to FIG. 7, the method 700 can be performed by an imaging device, such as the imaging device 6.

At block 702, the method 700 includes capturing, via the first camera, a first image having a first pixel density. In this context, a pixel of the first image that corresponds to the first optical axis is substantially centered within the first image. In some examples, the first image can be a "zoomed-in" or "zoomed-out" version of an image captured by the first camera.

Figure 11:
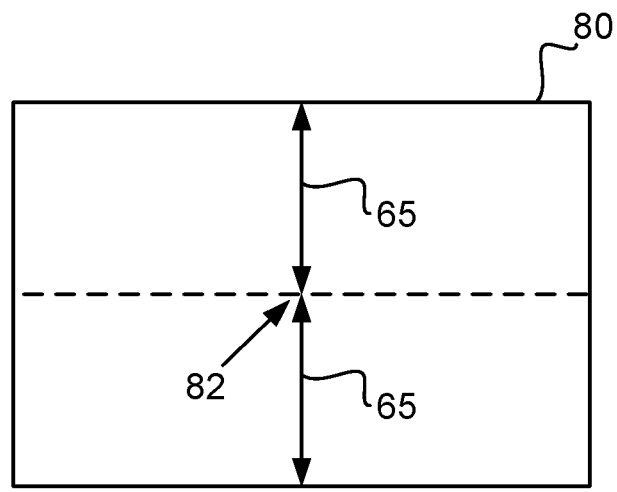
FIG. 11 is a schematic diagram of images, according to an example embodiment.
Figure 11:
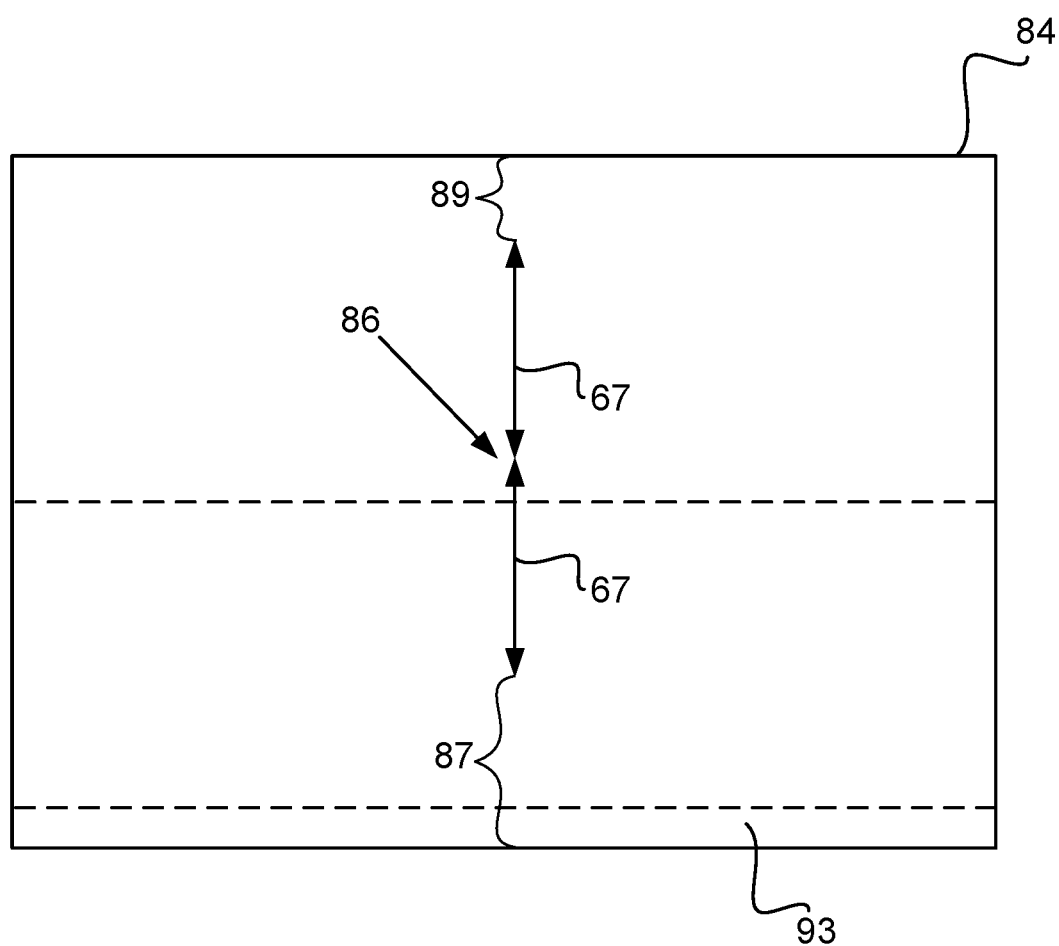

As shown in FIG. 11 for example, the camera 30A can capture an image 80 (e.g., a thermal image) having a first pixel density (e.g., defined as pixels per row of the image sensor of the camera 30A and/or pixels per column of the image sensor of the camera 30A). The image 80 could be a thermal image that depicts intensities and wavelengths of infrared radiation (e.g., 750 nanometers to 1 millimeter). A pixel 82 of the image 80 that corresponds to the optical axis 61 is substantially centered within the image 80. That is, the pixel 82 can be located halfway between the left and right borders of the image 80 and halfway between the top and bottom borders of the image 80. As shown in FIG. 11, the image 80 includes image data 65 corresponding to the object plane 66. The image data 65 spans between the top border of the image 80 and the bottom border of the image 80. That is, the image data 65 vertically spans the entire field of view 60 of the camera 30A.

At block 704, the method 700 includes capturing, via the second camera, a second image having a second pixel density that is greater than the first pixel density. In this context, a pixel of the second image that corresponds to the first optical axis is off-center within the second image. In some embodiments, the second camera captures the second image simultaneously with the first camera capturing the first image (e.g., in response to input received via the user interface 26). In some examples, the second image can be a "zoomed-in" or "zoomed-out" version of an image captured by the second camera.

As shown in FIG. 11 for example, the camera 30B can capture an image 84 (e.g., a visible light image) having a second pixel density that is greater than the first pixel density of the (e.g., thermal) image 80. The image 84 could have both a higher pixel per row density and a higher pixel per column density when compared to the image 80. The image 84 could be a visible light image that depicts intensities and wavelengths (e.g., 380 nanometers (nm) to 750 nm) of visible radiation that is visible to a human eye. A pixel 86 of the image 84 that corresponds to the optical axis 61 is off-center within the image 84. That is, the pixel 86 is located above a halfway point between the top and bottom borders of the image 84. As shown in FIG. 11, the image 84 includes image data 67 corresponding to the object plane 66. The image data 67 could represent the same physical object as the image data 65, for example. The image data 67 does not fully span between the top border of the image 84 and the bottom border of the image 84. That is, the image data 67 does not vertically span the entire field of view 62 of the camera 30B at least in part because the field of view 62 is wider in all directions than the field of view 60 at the object plane 66. As such, the image 84 includes at least a portion 87 (e.g. one or more pixel rows) and a portion 89 (e.g., one or more pixel rows) of the field of view 62 that is not represented within the image 80.

Figure 12:
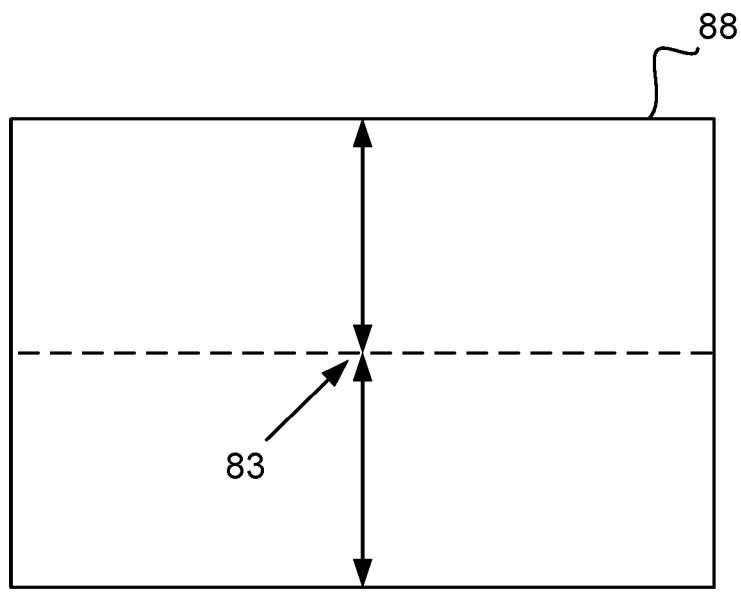
FIG. 12 is a schematic diagram of an image, according to an example embodiment.

At block 706, the method 700 includes processing the first image to generate a third image. Referring to FIGS. 11 and 12 for example, the imaging device 6 can "upscale" the image 80 to generate the image 88 using any image upscaling technique known in the art (e.g., a bilinear upscaling algorithm). That is, the image 88 has a pixel per row density and a pixel per column density that is greater than the respective pixel per row density and pixel per column density of the image 80. The image 88 shows the same field of view as the image 80. The image 88 has a pixel per row density and a pixel per column density that is less than the respective pixel per row density and pixel per column density of the image 84, however.

At block 708, the method 700 includes processing the second image to generate a fourth image such that a pixel of the fourth image that corresponds to the first optical axis is substantially centered within the fourth image. In this context, a pixel density of the third image is substantially equal to a pixel density of the fourth image and the fourth image represents a field of view that is substantially equal to a field of view represented by the third image.

Figure 13:
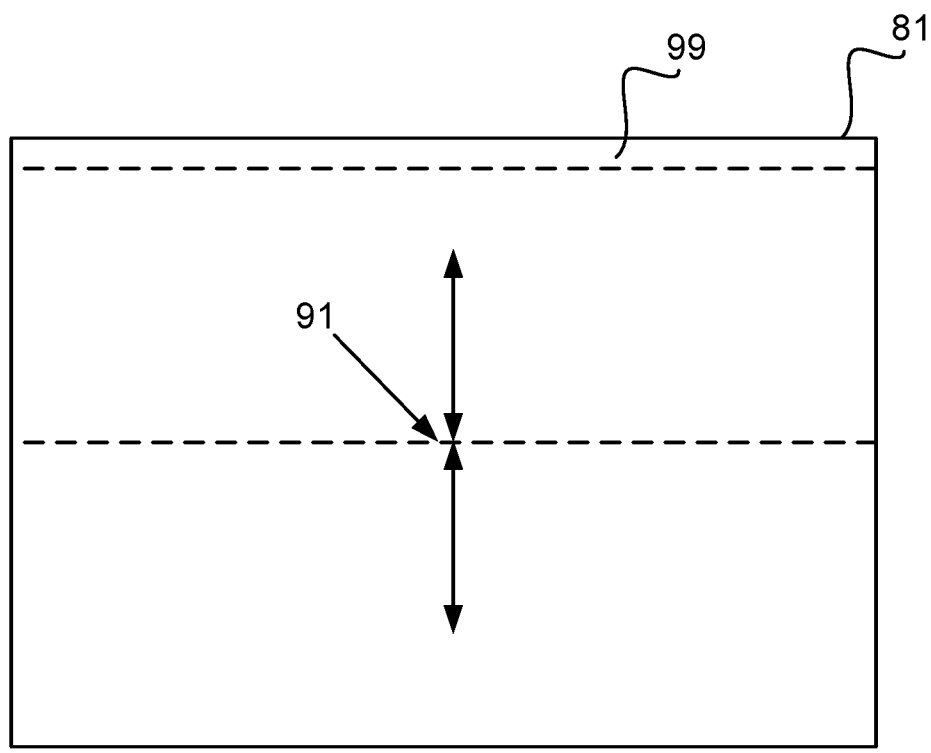
FIG. 13 is a schematic diagram of images, according to an example embodiment.
Figure 13:
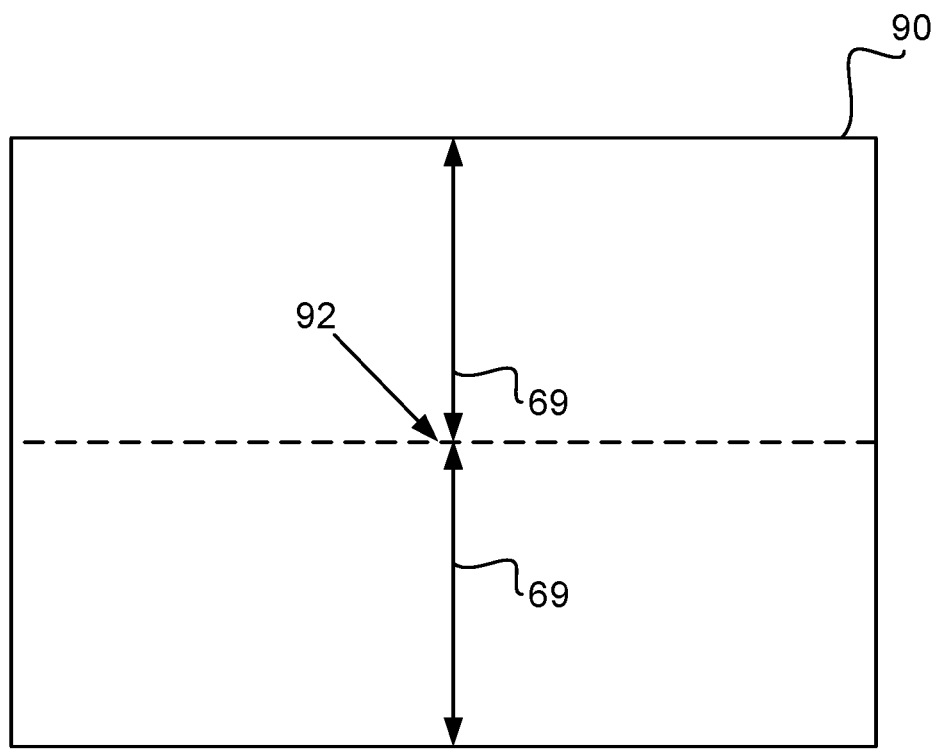

Referring to FIGS. 11 and 13, the imaging device 6 can process the image 84 to generate the image 90. In some examples, this can include the imaging device 6 processing the image 84 to generate the intermediate image 81, and then include processing the intermediate image 81 to generate the image 90. In this way, the imaging device 6 can process the image 84 to generate the image 90 such that a pixel 92 of the image 90 that corresponds to the optical axis 61 is substantially centered within the image 90. In addition, a pixel density of the image 88 is substantially equal to a pixel density of the image 90. The image 90 represents a field of view that is substantially equal to the field of view represented by the image 88 (e.g., the field of view 60). As such, the image 90 includes a total number of pixels that is less than a total number of pixels included in the image 84.

For example, the imaging device 6 can omit any image data within the region 93 of the image 84 when generating the intermediate image 81. The imaging device 6 can determine the height (e.g., a number of rows to omit) of the region 93 based on and/or using the following equation (1) below. Equation (2) can similarly be used to determine an amount of horizontal shift (e.g., in columns of pixels) that may be applied to the image 84. The height of the region 93 is generally equivalent to the amount of vertical image "shift" exhibited when comparing the images 81 and 84. For example, in addition to omitting image data from the region 93 of the image 84, the image 81 will also include a region 99 generally having only "empty" pixels. The region 99 generally has the same height as the region 93. After this "shifting" operation, a pixel 91 of the intermediate image 81 that corresponds to the optical axis 61 is located at the center of the intermediate image 81.

$$Spv = Pvv * \frac{Hv - Ht + Hg}{2 * Hv} \quad (1)$$

$$Sph = \frac{(Pvh - Pth)}{2} \quad (2)$$

Additionally, the imaging device 6 can downscale (e.g., shrink) and crop the intermediate image 81 such that the image data 69 vertically spans the entire field of view (e.g., the field of view 60) depicted by the image 90. The imaging device 6 can downscale the image 81 via a bilinear filter (e.g., taking a weighted average of the four nearest pixels to approximate each new pixel). The number of rows and columns of pixels for the image 90 can be calculated using the equations (3)-(5).

$$Pvv = \frac{Hv}{Ht} * (Ptv) \quad (3)$$

$$Pvv = (Ptv) * \frac{\tan B}{\tan A} * \left(1 + \frac{Dg}{d}\right) \quad (4)$$

$$Vscaling = Pvv / (2 * Ptv) \quad (5)$$

Further embodiments can involve the imaging device 6 processing the image 88 and the image 90 to generate a composite image representing intensities and wavelengths of both the infrared radiation depicted by the image 88 and the visible radiation depicted by the image 90. For example, the composite image can take the form of a hybrid thermal/visible light image where each pixel of the composite image represents a weighted average of the corresponding pixel of the image 88 and the corresponding pixel of the image 90. A user can operate the user interface of the imaging device to display the composite image with varying "opacity" settings. For example, a 0% opacity setting would render the composite image equivalent to the (e.g., visible light) image 90, a 100% opacity setting would render the composite image equivalent to the (e.g., thermal) image 88, and a 50% opacity setting would cause each pixel of the composite image to be the (unweighted) average of the corresponding pixels of the images 88 and 90.

Figure 14:
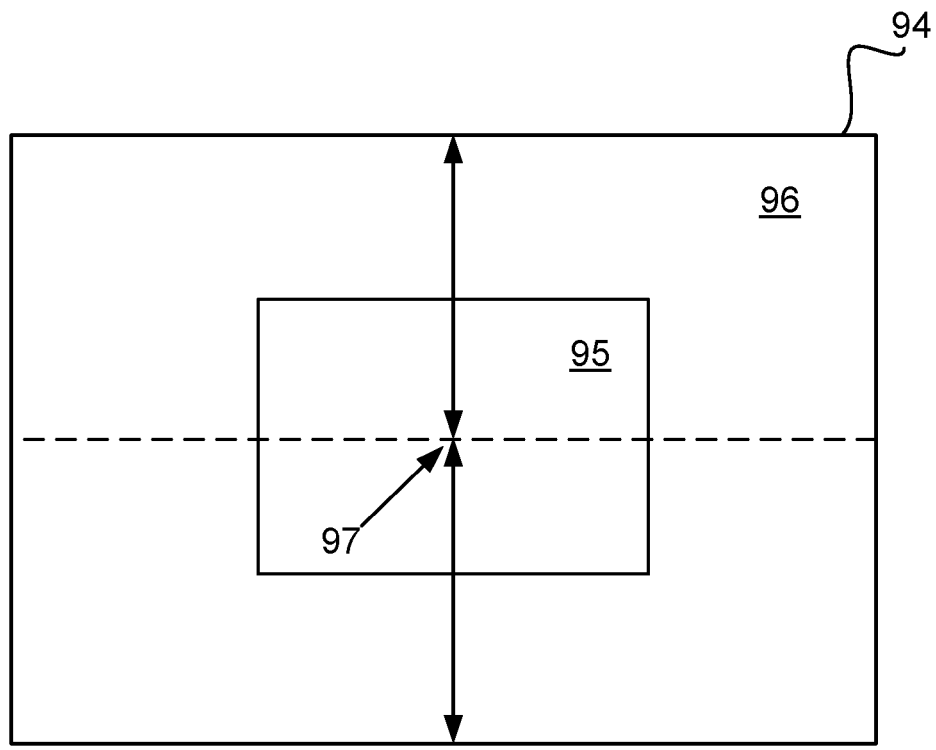
FIG. 14 is a schematic diagram of an image, according to an example embodiment.

In another embodiment, the composite image can take a "picture-in-picture" form. Referring to FIG. 14 as an example, the composite image 94 includes a portion 95 of the image 88 and a portion 96 of the image 90. In this context, the portion 96 of the image 90 surrounds the portion 95 of the image 88. Additionally, the portion 95 of the image 88 is aligned with the portion 96 of the image 90 such that the optical axis 61 is represented by a common pixel 97 of the composite image.

Figure 8:
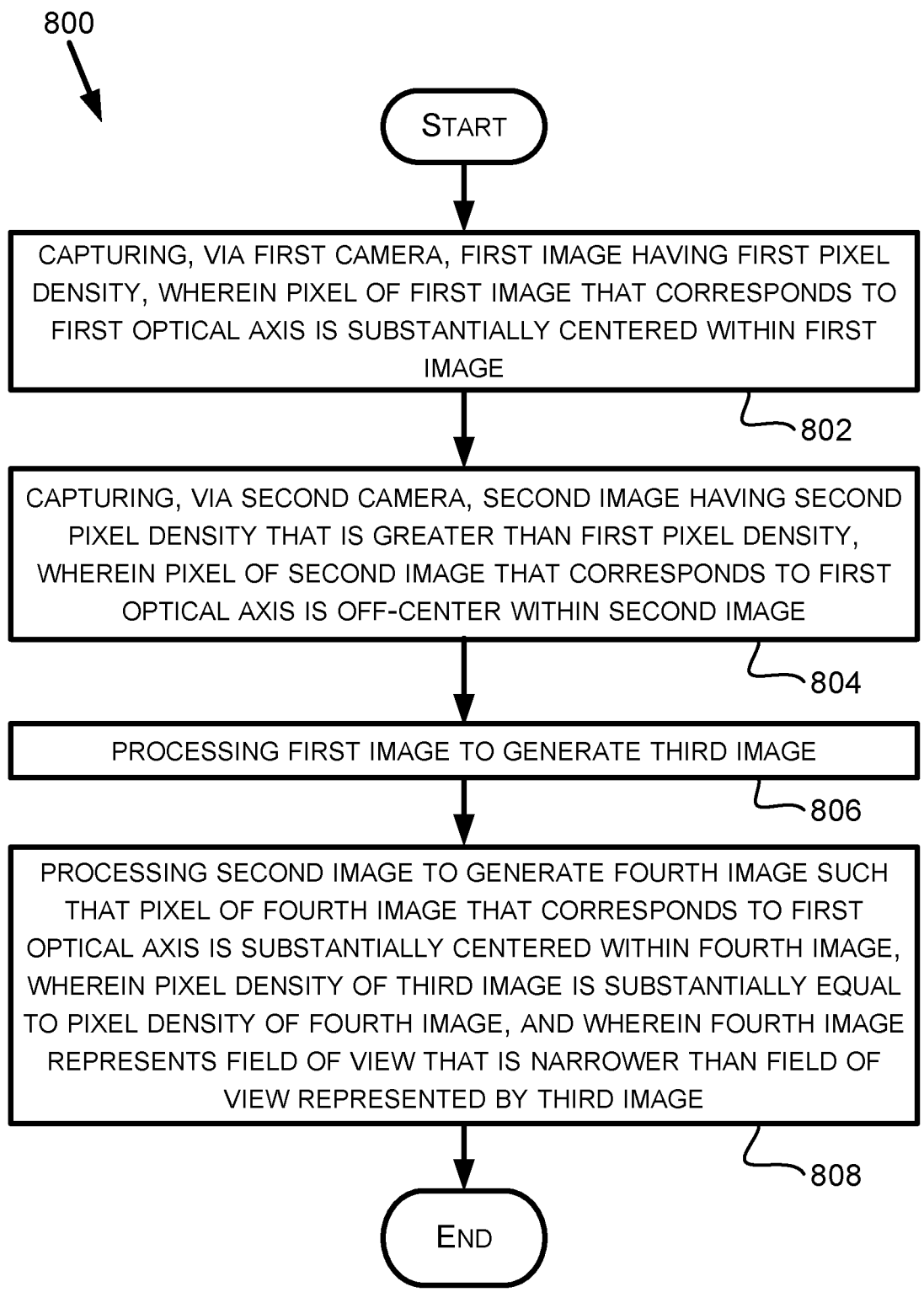
FIG. 8 is a block diagram of a method, according to an example embodiment.

Referring to FIG. 8, the method 800 can be performed by an imaging device, such as the imaging device 6.

At block 802, the method 800 includes capturing, via the first camera, a first image having a first pixel density. In this context, a pixel of the first image that corresponds to the first optical axis is substantially centered within the first image. Block 802 can be performed in any way described above with reference to block 702, with potential differences as described below.

Figure 15:
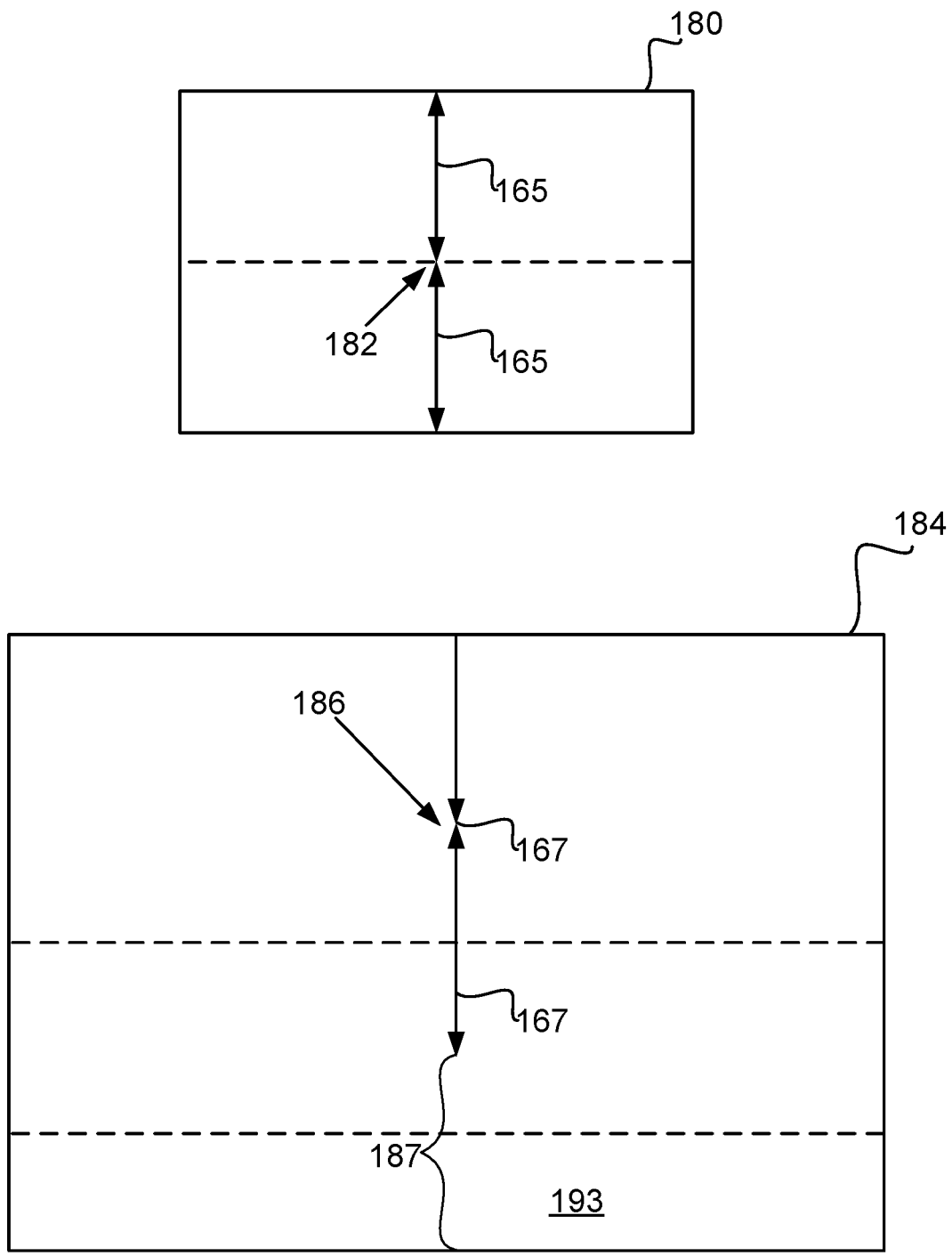
FIG. 15 is a schematic diagram of images, according to an example embodiment.

As shown in FIG. 15 for example, the camera 30A can capture an image 180 (e.g., a thermal image) having a first pixel density (e.g., defined as pixels per row of the image sensor of the camera 30A and/or pixels per column of the image sensor of the camera 30A). The image 180 could be a thermal image that depicts intensities and wavelengths of infrared radiation (e.g., 750 nanometers to 1 millimeter). A pixel 182 of the image 180 that corresponds to the optical axis 61 is substantially centered within the image 180. That is, the pixel 182 can be located halfway between the left and right borders of the image 180 and halfway between the top and bottom borders of the image 180. As shown in FIG. 15, the image 180 includes image data 165 corresponding to the object plane 66. The image data 165 spans between the top border of the image 180 and the bottom border of the image 180. That is, the image data 165 vertically spans the entire field of view 60 of the camera 30A.

At block 804, the method 800 includes capturing, via the second camera, a second image having a second pixel density that is greater than the first pixel density. In this context, a pixel of the second image that corresponds to the first optical axis is off-center within the second image. Block 804 can be performed in any way described above with reference to block 704 with potential differences described below.

As shown in FIG. 15 for example, the camera 30B can capture an image 184 (e.g., a visible light image) having a second pixel density that is greater than the first pixel density of the (e.g., thermal) image 180. The image 184 could have both a higher pixel per row density and a higher pixel per column density when compared to the image 180. The image 184 could be a visible light image that depicts intensities and wavelengths (e.g., 380 nanometers (nm) to 750 nm) of visible radiation that is visible to a human eye. A pixel 186 of the image 184 that corresponds to the optical axis 61 is off-center within the image 184. That is, the pixel 186 is located above a halfway point between the top and bottom borders of the image 184. As shown in FIG. 15, the image 184 includes image data 167 corresponding to the object plane 66. The image data 167 could represent the same physical object as the image data 165, for example. In some embodiments, due to vertical misalignment of the cameras 30A and 30B and the resultant misalignment (e.g., non-parallel alignment) of the optical axes 61 and 64 (not shown in FIG. 6), the top end of the physical object might not be captured within the image 184. The image data 167 does not fully span between the top border of the image 184 and the bottom border of the image 184. That is, the image data 167 does not vertically span the entire field of view 62 of the camera 30B at least in part because the field of view 62 is wider in all directions than the field of view 60 at the object plane 66. As such, the image 184 includes at least a portion 187 (e.g. one or more pixel rows) that is not represented within the image 180.

Figure 16:
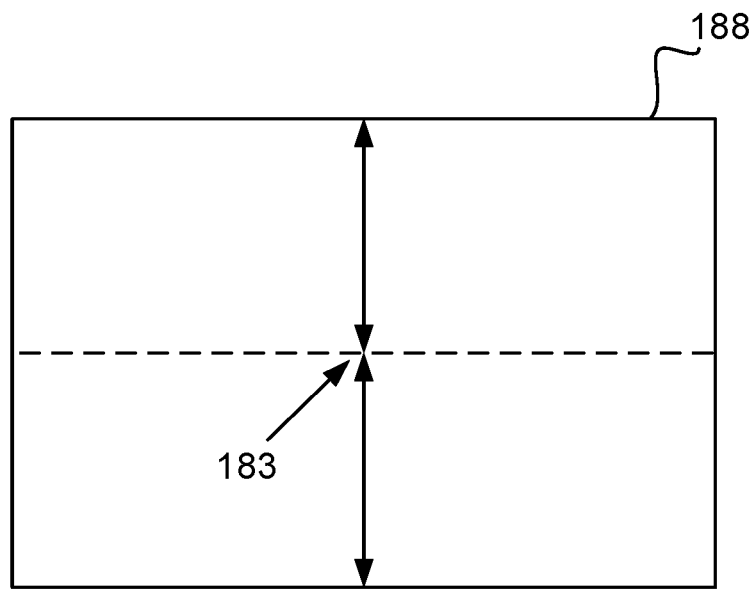
FIG. 16 is a schematic diagram of an image, according to an example embodiment.

At block 806, the method 800 includes processing the first image to generate a third image. Block 806 can be performed in any way described above with reference to block 706 with potential differences described below. Referring to FIGS. 15 and 16 for example, the imaging device 6 can "upscale" the image 180 to generate the image 188 using any image upscaling technique known in the art (e.g., a bilinear upscaling algorithm). That is, the image 188 has a pixel per row density and a pixel per column density that is greater than the respective pixel per row density and pixel per column density of the image 180. The image 188 shows the same field of view as the image 180. The image 188 has a pixel per row density and a pixel per column density that is less than the respective pixel per row density and pixel per column density of the image 184, however.

At block 808, the method 800 includes processing the second image to generate a fourth image such that a pixel of the fourth image that corresponds to the first optical axis is substantially centered within the fourth image. In this context, a pixel density of the third image is substantially equal to a pixel density of the fourth image and the fourth image represents a field of view that is narrower than a field of view represented by the third image. Block 808 can be performed in any way described above with reference to block 708, with differences as described below.

Figure 17:
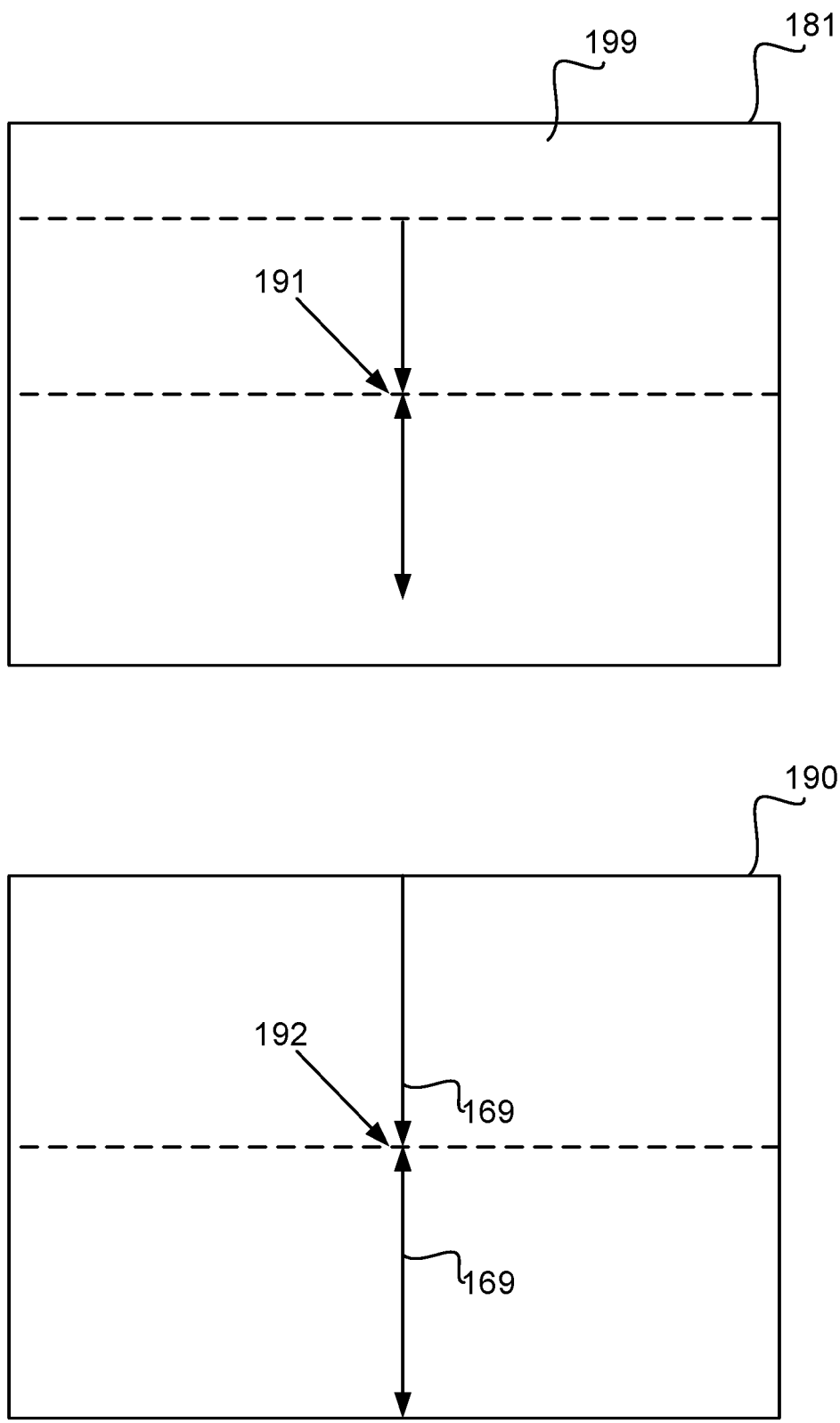
FIG. 17 is a schematic diagram of images, according to an example embodiment.

Referring to FIGS. 15 and 17, the imaging device 6 can process the image 184 to generate the image 190. In some examples, this can include the imaging device 6 processing the image 184 to generate the intermediate image 181, and then include processing the intermediate image 181 to generate the image 190. In this way, the imaging device 6 can process the image 184 to generate the image 190 such that a pixel 192 of the image 190 that corresponds to the optical axis 61 is substantially centered within the image 190. In addition, a pixel density of the image 188 is substantially equal to a pixel density of the image 190. The image 190 represents a field of view that is narrower than the field of view represented by the image 188 (e.g., the field of view 60). That is, when the image 190 and the image 188 are used to form a composite image (e.g., a hybrid thermal/visible light image), objects from the thermal image might be slightly misaligned with objects from the visible light image. The image 190 includes a total number of pixels that is less than a total number of pixels included in the image 184.

For example, the imaging device 6 can omit any image data within the region 193 of the image 184 when generating the intermediate image 181. The imaging device 6 can determine the height (e.g., a number of rows to omit) of the region 193 based on and/or using equation (1) above. Equation (2) above can similarly be used to determine an amount of horizontal shift (e.g., in columns of pixels) that may be applied to the image 184. The height of the region 193 is generally equivalent to the amount of vertical image "shift" exhibited when comparing the images 181 and 184.

For example, in addition to omitting image data from the region 193 of the image 184, the image 181 will also include a region 199 generally having only "empty" pixels. The region 199 generally has the same height as the region 193. After this "shifting" operation, a pixel 191 of the intermediate image 181 that corresponds to the optical axis 61 is located at the center of the intermediate image 181.

Additionally, the imaging device 6 can downscale (e.g., shrink) and crop the intermediate image 181 such that the image data 169 vertically spans the entire field of view depicted by the image 190. The imaging device 6 can downscale the image 181 via a bilinear filter (e.g., taking a weighted average of the four nearest pixels to approximate each new pixel). The number of rows and columns of pixels for the image 190 can be calculated using the equations (3)-(5) above.

Further embodiments can involve the imaging device 6 processing the image 188 and the image 190 to generate a composite image representing intensities and wavelengths of both the infrared radiation depicted by the image 188 and the visible radiation depicted by the image 190. For example, the composite image can take the form of a hybrid thermal/visible light image where each pixel of the composite image represents a weighted average of the corresponding pixel of the image 188 and the corresponding pixel of the image 190. A user can operate the user interface of the imaging device to display the composite image with varying "opacity" settings. For example, a 0% opacity setting would render the composite image equivalent to the (e.g., visible light) image 190, a 100% opacity setting would render the composite image equivalent to the (e.g., thermal) image 188, and a 50% opacity setting would cause each pixel of the composite image to be the (unweighted) average of the corresponding pixels of the images 188 and 190.

Figure 9:
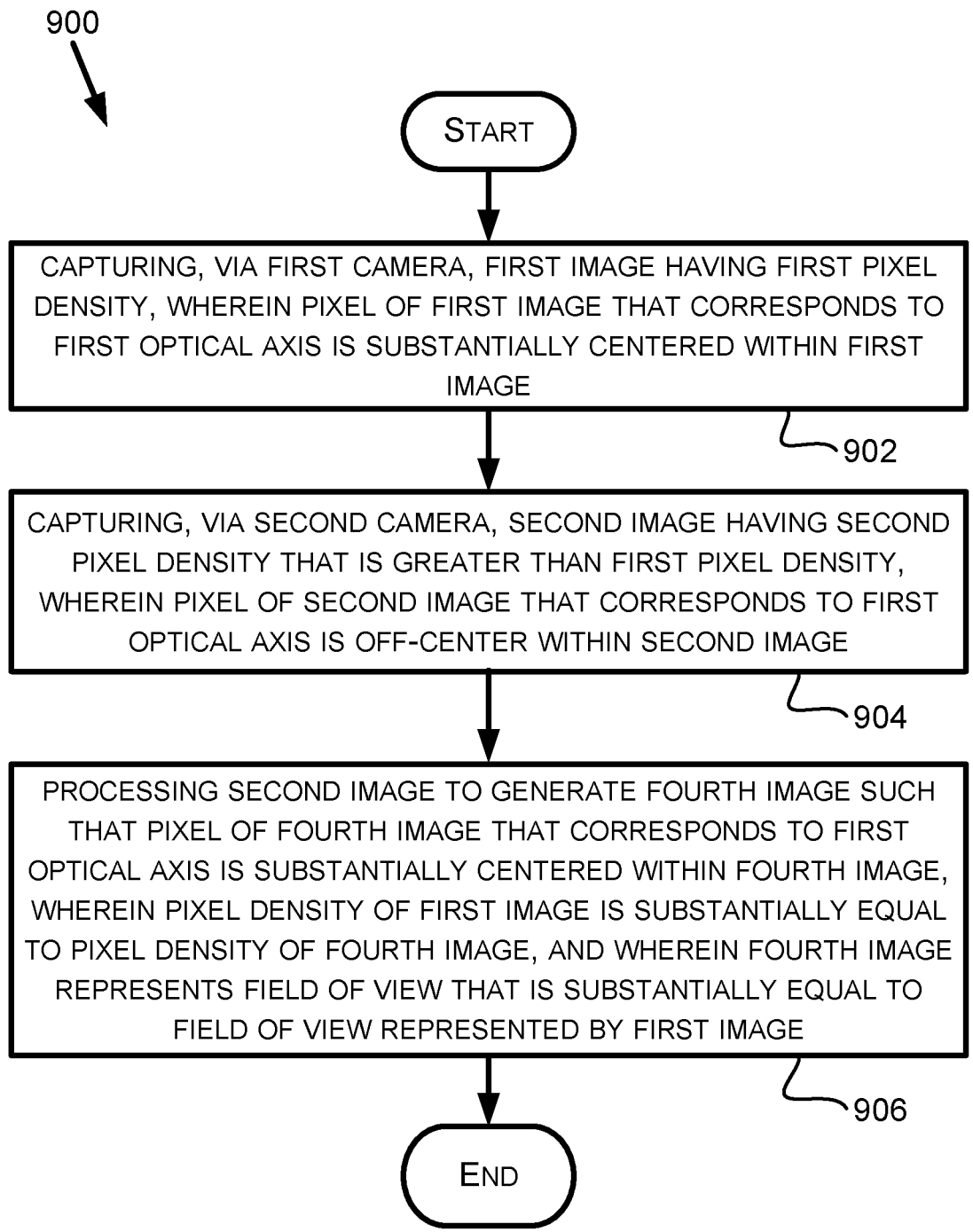
FIG. 9 is a block diagram of a method, according to an example embodiment.

Referring to FIG. 9, the method 900 can be performed by an imaging device, such as the imaging device 6.

At block 902, the method 900 includes capturing, via the first camera, a first image having a first pixel density. In this context, a pixel of the first image that corresponds to the first optical axis is substantially centered within the first image. Block 802 can be performed in any way described above with reference to blocks 702 or 802.

At block 904, the method includes capturing, via the second camera, a second image having a second pixel density that is greater than the first pixel density. In this context, a pixel of the second image that corresponds to the first optical axis is off-center within the second image. Block 904 can be performed in any way described above with reference to blocks 704 or 804.

At block 906, the method includes processing the second image to generate a fourth image such that a pixel of the fourth image that corresponds to the first optical axis is substantially centered within the fourth image. In this context, a pixel density of the first image is substantially equal to a pixel density of the fourth image and the fourth image represents a field of view that is substantially equal to field of view represented by the first image. Block 906 can be performed in any way described above with reference to blocks 708 or 808. In this way, the method 900 is similar to the method 700 and related embodiments but differs in that no upscaling is performed on the first image (e.g., the image 80) and the first image is used in place of the third image (e.g., the image 88) described in above methods.

Figure 10:
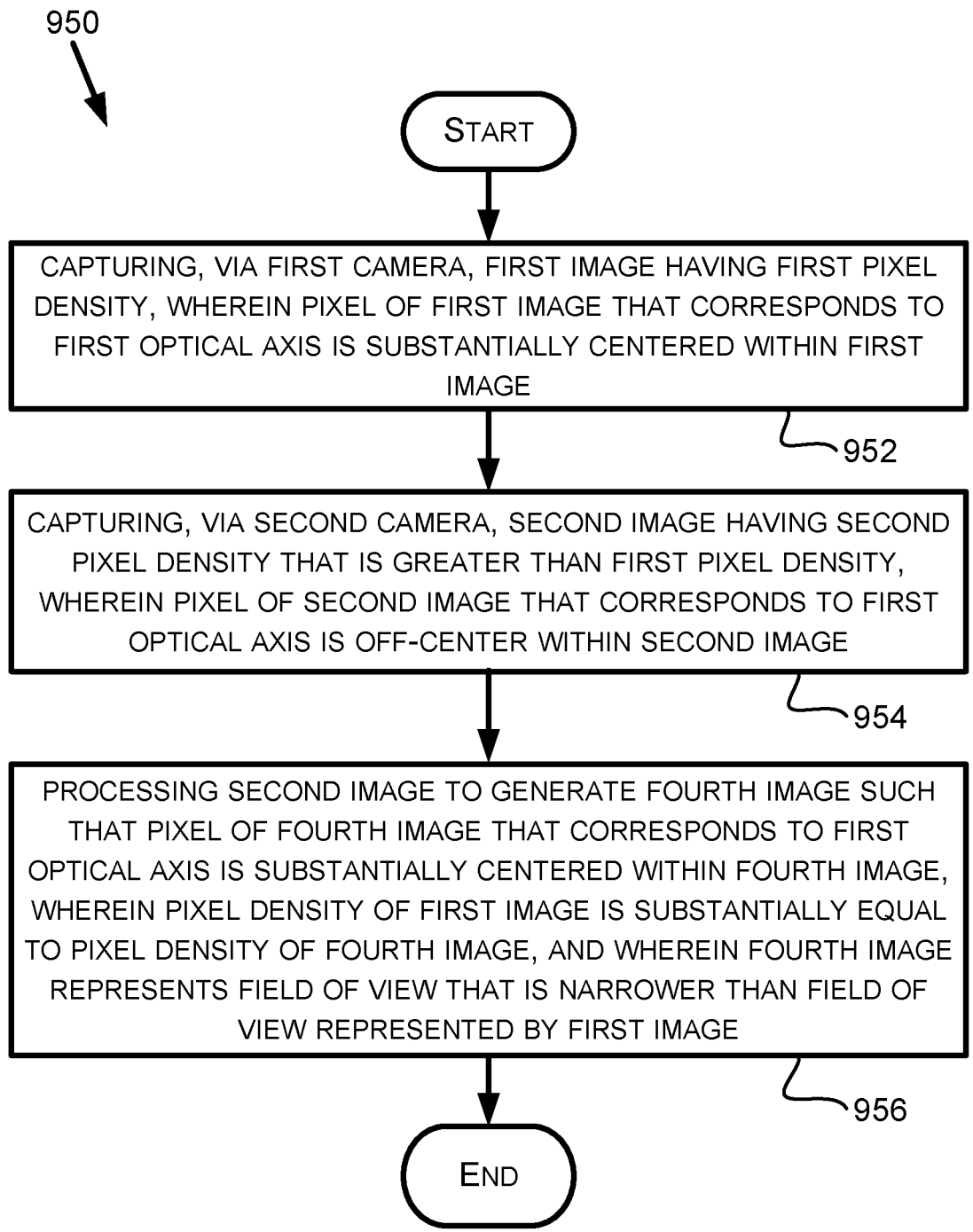
FIG. 10 is a block diagram of a method, according to an example embodiment.

Referring to FIG. 10, the method 950 can be performed by an imaging device, such as the imaging device 6.

At block 952, the method 950 includes capturing, via the first camera, a first image having a first pixel density. In this context, a pixel of the first image that corresponds to the first optical axis is substantially centered within the first image. Block 952 can be performed in any way described above with reference to blocks 702, 802, or 902.

At block 954, the method 950 includes capturing, via the second camera, a second image having a second pixel density that is greater than the first pixel density. In this context, a pixel of the second image that corresponds to the first optical axis is off-center within the second image. Block 954 can be performed in any way described above with reference to blocks 704, 804, or 904.

At block 956, the method 950 includes processing the second image to generate a fourth image such that a pixel of the fourth image that corresponds to the first optical axis is substantially centered within the fourth image. In this context, a pixel density of the first image is substantially equal to a pixel density of the fourth image and the fourth image represents a field of view that is narrower than a field of view represented by the first image. Block 956 can be performed in any way described above with reference to blocks 708, 808, or 908. In this way, the method 950 is similar to the method 800 and related embodiments but differs in that no upscaling is performed on the first image (e.g., the image 180) and the first image is used in place of the third image (e.g., the image 188) described in above methods.

This application incorporates by reference U.S. Patent Application No. 16/020,970, which was filed on Jun. 27, 2018, is entitled "Method and system for displaying images captured by a computing device including a visible light camera and a thermal camera," and has Attorney Docket No. 17-1382.

This application incorporates by reference U.S. Patent Application No. 16/020,976, which was filed on Jun. 27, 2018, is entitled "Method and system for displaying images captured by a computing device including a visible light camera and a thermal camera," and has Attorney Docket No. 18-164.

This application incorporates by reference U.S. Patent Application No. 16/020,867, which was filed on Jun. 27, 2018, is entitled "Gain Switching Techniques for Thermal Cameras," and has Attorney Docket No. 18-137.

IV. Conclusion

Example embodiments have been described above. Those skilled in the art will understand that changes and modifications can be made to the described embodiments without departing from the true scope of the present invention, which is defined by the claims.

Additional embodiments, based on the features or functions described herein, can be embodied as a non-transitory computer-readable medium storing program instructions, that when executed by a processor of a machine cause a set of functions to be performed, the set of functions comprising the features or functions of the aspects and embodiments described herein.

We claim:

1. An imaging device comprising:
one or more processors;
a first camera having a first field of view that is aligned with a first optical axis;
a second camera having a second field of view that is aligned with a second optical axis that is not collinear with the first optical axis, wherein the second field of view encompasses the first field of view at an object plane that is separated from the first camera by at least a threshold distance, wherein the first field of view extends beyond the second field of view in at least one direction at an object plane that is closer to the first camera than the threshold distance;
a display; and
a computer readable medium storing instructions that, when executed by the one or more processors, cause the imaging device to perform functions comprising:
capturing, via the first camera, a first image having a first pixel density, wherein a pixel of the first image that corresponds to the first optical axis is substantially centered within the first image;
capturing, via the second camera, a second image having a second pixel density that is greater than the first pixel density, wherein a pixel of the second image that corresponds to the first optical axis is off-center within the second image;
processing the first image to generate a third image; and
processing the second image to generate a fourth image such that a pixel of the fourth image that corresponds to the first optical axis is substantially centered within the fourth image, wherein a pixel density of the third image is substantially equal to a pixel density of the fourth image, and wherein the fourth image represents a field of view that is substantially equal to a field of view represented by the third image.

2. The imaging device of claim 1, wherein the first image is a thermal image that depicts intensities and wavelengths of infrared radiation.

3. The imaging device of claim 2, wherein the wavelengths of infrared radiation depicted by the first image are all greater than or equal to 750 nanometers and less than or equal to 1 millimeter.

4. The imaging device of claim 1, wherein a depth of field of the first camera is less than a depth of field of the second camera.

5. The imaging device of claim 1, wherein the second image is a visible light image that depicts intensities and wavelengths of visible radiation that is visible to a human eye.

6. The imaging device of claim 5, wherein the wavelengths of visible radiation depicted by the second image are all greater than or equal to 380 nanometers and less than or equal to 750 nanometers.

7. The imaging device of claim 1, wherein the first image and the second image are captured simultaneously.

8. The imaging device of claim 1, wherein processing the first image comprises upscaling the first image.

9. The imaging device of claim 1, wherein processing the second image comprises downscaling the second image.

10. The imaging device of claim 1, wherein processing the second image comprises shifting the second image.

11. The imaging device of claim 1, wherein the second image includes image data representing a portion of the field of view, and wherein the fourth image does not include image data representing the portion of the field of view.

12. The imaging device of claim 11, wherein the portion of the field of view is represented at a bottommost region of the second image.

13. The imaging device of claim 1, wherein the fourth image includes a total number of pixels that is less than a total number of pixels included in the second image.

14. The imaging device of claim 1, the functions further comprising processing the third image and the fourth image to generate a composite image representing intensities and wavelengths of both the infrared radiation depicted by the third image and the visible radiation depicted by the fourth image.

15. The imaging device of claim 14, the functions further comprising:
displaying the composite image on the display.

16. The imaging device of claim 14, wherein the composite image comprises:
a portion of the third image; and
a portion of the fourth image, wherein the portion of the fourth image surrounds the portion of the third image, and wherein the portion of the third image is aligned with the portion of the fourth image such that the first optical axis is represented by the same pixel of the composite image.

17. The imaging device of claim 14, wherein processing the third image and the fourth image to generate a composite image comprises determining a weighted average of (i) a value representing an intensity or a color corresponding to a pixel of the third image and (ii) a value representing an intensity or a color corresponding to a pixel of the fourth image.

18. An imaging device comprising:
one or more processors;
a first camera having a first field of view that is aligned with a first optical axis;
a second camera having a second field of view that is aligned with a second optical axis that is not collinear with the first optical axis, wherein the second field of view encompasses the first field of view at an object plane that is separated from the first camera by at least a threshold distance, wherein the first field of view extends beyond the second field of view in at least one direction at an object plane that is closer to the first camera than the threshold distance;
a display; and
a computer readable medium storing instructions that, when executed by the one or more processors, cause the imaging device to perform functions comprising:
capturing, via the first camera, a first image having a first pixel density, wherein a pixel of the first image that corresponds to the first optical axis is substantially centered within the first image;
capturing, via the second camera, a second image having a second pixel density that is greater than the first pixel density, wherein a pixel of the second image that corresponds to the first optical axis is off-center within the second image;
processing the first image to generate a third image; and
processing the second image to generate a fourth image such that a pixel of the fourth image that corresponds to the first optical axis is substantially centered within the fourth image, wherein a pixel density of the third image is substantially equal to a pixel density of the fourth image, and wherein the fourth image represents a field of view that is narrower than a field of view represented by the third image.

19. The imaging device of claim 18, wherein at least one object in the fourth image is larger than in the third object.

20. An imaging device comprising:
one or more processors;
a first camera having a first field of view that is aligned with a first optical axis;
a second camera having a second field of view that is aligned with a second optical axis that is not collinear with the first optical axis, wherein the second field of view encompasses the first field of view at an object plane that is separated from the first camera by at least a threshold distance, wherein the first field of view extends beyond the second field of view in at least one direction at an object plane that is closer to the first camera than the threshold distance;
a display; and
a computer readable medium storing instructions that, when executed by the one or more processors, cause the imaging device to perform functions comprising:
capturing, via the first camera, a first image having a first pixel density, wherein a pixel of the first image that corresponds to the first optical axis is substantially centered within the first image;
capturing, via the second camera, a second image having a second pixel density that is greater than the first pixel density, wherein a pixel of the second image that corresponds to the first optical axis is off-center within the second image; and
processing the second image to generate a fourth image such that a pixel of the fourth image that corresponds to the first optical axis is substantially centered within the fourth image, wherein a pixel density of the first image is substantially equal to a pixel density of the fourth image, and wherein the fourth image represents a field of view that is substantially equal to field of view represented by the first image.

* * * * *